(12) United States Patent
Arcieri et al.

(10) Patent No.: US 7,107,335 B1
(45) Date of Patent: Sep. 12, 2006

(54) NETWORK ACCESS CONTROL DEVICE THROUGH FAST RECOGNITION OF APPLICATION FRAMES

(75) Inventors: Franco Arcieri, Rome (IT); Guido Maria Marinelli, Rome (IT); Maurizio Talamo, Rome (IT)

(73) Assignee: Alasi Di Arcieri Franco & C. s.a.s., Rome (IT)

( * ) Notice: Subject to any disclaimer, the term of this patent is extended or adjusted under 35 U.S.C. 154(b) by 0 days.

(21) Appl. No.: 09/762,540

(22) PCT Filed: Aug. 11, 1999

(86) PCT No.: PCT/IT99/00262

§ 371 (c)(1),
(2), (4) Date: Apr. 11, 2001

(87) PCT Pub. No.: WO00/10304

PCT Pub. Date: Feb. 24, 2000

(30) Foreign Application Priority Data

Aug. 12, 1998 (IT) .............................. RM98A0542

(51) Int. Cl.
*G06F 15/173* (2006.01)
(52) U.S. Cl. ...................... 709/224; 709/226; 713/201; 370/392; 707/104
(58) Field of Classification Search ................ 709/225, 709/224, 226; 320/392; 713/201; 707/104
See application file for complete search history.

(56) References Cited

U.S. PATENT DOCUMENTS

| 5,101,402 | A | | 3/1992 | Chiu et al. ..................... 370/17 |
| 5,602,905 | A | | 2/1997 | Mettke ......................... 379/96 |
| 5,727,163 | A | | 3/1998 | Bezos ........................ 395/227 |
| 5,793,954 | A | | 8/1998 | Baker et al. |
| 5,999,942 | A | * | 12/1999 | Talati ....................... 707/104.1 |
| 6,006,264 | A | * | 12/1999 | Colby et al. ................. 709/226 |
| 6,212,184 | B1 | * | 4/2001 | Venkatachary et al. ...... 370/392 |
| 6,449,647 | B1 | * | 9/2002 | Colby et al. ................. 709/226 |
| 6,460,141 | B1 | * | 10/2002 | Olden ......................... 713/201 |
| 6,560,648 | B1 | * | 5/2003 | Dunn et al. .................. 709/224 |

FOREIGN PATENT DOCUMENTS

| EP | 0 595 509 | 5/1994 |
| EP | 0 726 664 | 8/1996 |
| EP | 0 801 479 | 10/1997 |
| WO | 98/36532 | 8/1998 |
| WO | 98/49658 | 11/1998 |

OTHER PUBLICATIONS

Prufer, "Network Advisor Protocol Analysis: Decodes", *Hewlett-Packard Journal*, pp. 34-40 (Oct. 1992).
Bhat, "The Network Advisor Analysis and Real-Time Environment", *Hewlett-Packard Journal*, pp. 29-33 (Oct. 1992).

(Continued)

*Primary Examiner*—Bunjob Jaroenchonwanit
*Assistant Examiner*—Thanh T Nguyen
(74) *Attorney, Agent, or Firm*—Ladas & Parry LLP

(57) ABSTRACT

A network access control device for deterministic recognition of application frames satisfying a set of predetermined rules comprises: means (205) for monitoring and interpretation of the application frames to recognize; means (201) for storing the predetermined rules; means (202) for compiling the predetermined rules in a direct access data structure; means (203) for storing the direct access data structure; and means (204) for comparing the application frames to be recognized with the direct access data structure, wherein the recognition is able to be performed on any frame component and the direct access data structure allows an access time substantially independent from the number of rules.

11 Claims, 12 Drawing Sheets

OTHER PUBLICATIONS

Bhat, Sunil, "The Network Advisor Analysis and Real-Time Environment", *Hewlett-Packard Journal*, vol. 43, No. 5, pp. 29-33 (Oct. 1992).

Jander, Mary, "WAN Protocol Analyzers", *Data Communications*, vol. 21, No. 6, pp. 69-81 (Apr. 1992).

Kafka, Gerhard, "Protokollanalysatoren", *Elektronik*, vol. 36, No. 4, pp. 111-117 (Feb. 1987).

Prufer, R.J., "Network Advisor Protocol Analysis: Decodes", *Hewlett-Packard Journal*, vol. 43, No. 5, pp. 34-40 (Oct. 1992).

* cited by examiner

FIG. 12

| | 0 | 1 | 2 | 3 | 4 | 5 | 6 | 7 | 8 | 9 | 0A | 0B | 0C |
|---|---|---|---|---|---|---|---|---|---|---|---|---|---|
| 1: | (08,000C) | (00,000D) | (06,4009) | (84,400C) | (93,400D) | (C8,400E) | (0A,400F) | (84,4010) | (93,4011) | (A0,4012) | (01,4013) | (00,8002) | (50,8003) |
| 2: | (08,000C) | (00,000D) | (06,4009) | (84,400C) | (93,400D) | (C8,400E) | (0A,400F) | (84,4010) | (93,4011) | (A0,4012) | (02,4013) | (00,8002) | (19,8003) |
| 3: | (08,000C) | (00,000D) | (06,4009) | (84,400C) | (93,400D) | (C8,400E) | (0A,400F) | (84,4010) | (93,4011) | (A0,4012) | (02,4013) | (00,8002) | (89,8003) |
| 4: | (08,000C) | (00,000D) | (06,4009) | (84,400C) | (93,400D) | (C8,400E) | (0A,400F) | (84,4010) | (93,4011) | (A0,4012) | (02,4013) | (00,8002) | (8A,8003) |
| 5: | (08,000C) | (00,000D) | (06,4009) | (84,400C) | (93,400D) | (C8,400E) | (0A,400F) | (84,4010) | (93,4011) | (A0,4012) | (02,4013) | (00,8002) | (8B,8003) |
| 6: | (08,000C) | (00,000D) | (06,4009) | (84,400C) | (93,400D) | (C8,400E) | (14,400F) | (84,4010) | (93,4011) | (A0,4012) | (01,4013) | (00,8002) | (14,8003) |
| 7: | (08,000C) | (00,000D) | (06,4009) | (84,400C) | (93,400D) | (C8,400E) | (14,400F) | (84,4010) | (93,4021) | (A0,4012) | (01,4013) | (00,8002) | (15,8003) |
| 8: | (08,000C) | (00,000D) | (06,4009) | (84,400C) | (93,400D) | (C8,400E) | (14,400F) | (84,4010) | (93,4011) | (A0,4012) | (01,4013) | (00,8002) | (17,8003) |
| 9: | (08,000C) | (00,000D) | (06,4009) | (84,400C) | (93,400D) | (C8,400E) | (14,400F) | (84,4010) | (93,4011) | (A0,4012) | (02,4013) | (00,8002) | (19,8003) |
| 0A: | (08,000C) | (00,000D) | (06,4009) | (84,400C) | (93,400D) | (C8,400E) | (14,400F) | (84,4010) | (93,4011) | (A0,4012) | (03,4013) | (00,8002) | (50,8003) |
| 0B: | (08,000C) | (00,000D) | (06,4009) | (84,400C) | (93,400D) | (C8,400E) | (14,400F) | (84,4010) | (93,4021) | (A0,4012) | (03,4013) | (00,8002) | (50,8003) |
| 0C: | (08,000C) | (00,000D) | (06,4009) | (84,400C) | (93,400D) | (C8,400E) | (14,400F) | (84,4010) | (93,4011) | (A0,4012) | (03,4013) | (00,8002) | (A1,8003) |
| 0D: | (08,000C) | (00,000D) | (06,4009) | (84,400C) | (93,400D) | (C8,400E) | (14,400F) | (84,4010) | (93,4011) | (A0,4012) | (03,4013) | (00,8002) | (A2,8003) |
| 0E: | (08,000C) | (00,000D) | (06,4009) | (84,400C) | (93,400D) | (C8,400E) | (14,400F) | (84,4010) | (93,4011) | (A0,4012) | (03,4013) | (00,8002) | (01,8003) |
| 0F: | (08,000C) | (00,000D) | (06,4009) | (84,400C) | (93,400D) | (C8,400E) | (14,400F) | (84,4010) | (93,4011) | (A0,4012) | (03,4013) | (08,8002) | (17,8003) |
| 10: | (08,000C) | (06,000D) | | | | | | | | | | | |
| 11: | (08,000C) | (00,000D) | (01,4009) | | | | | | | | | | |

NETWORK ACCESS CONTROL DEVICE THROUGH FAST RECOGNITION OF APPLICATION FRAMES

The present invention provides a network access control device through fast recognition of application frames satisfying a set of predetermined rules.

In particular, the device according to the invention allows both monitoring and interpretation of application protocols for network data transmission systems and the comparison with a set of control patterns of every monitored and interpreted communication frame. If a frame is recognized, the device allows access to the service. If the frame is not recognized, the device denies access to the service.

In the present description, for "pattern" (or access rule) the recognition statement of a particular communication frame will be intended.

Preferably, such statement will be intended as a set of <data type>/<data value> pairs assumed by the fields inside the communication frame. The <data type>/<data value> pairs are specified according to the various communication layers inside the communication frame concerning both the control and the information portion. In the present description, by way of example, communication frames of the HTTP (Internet browsing services) kind will be illustrated.

Network access control devices are known and can be divided into two large categories:

1) In a first category, the various access rules are represented by means of multidimensional matrices represented in a non-compressed form, using simple languages to access said matrices. The disadvantage of such a representation is given by the high memory occupation: a 10-dimensional matrix with 100 elements per dimension has a memory occupation of 100 10.

2) In a second category, the various access rules are represented by means of multidimensional matrices represented in a compressed form. The access to said matrices is not of a direct type. Such a manner has the disadvantage of requiring the use of high level languages, which determine the particular procedure to be activated in response to the recognition of an access rule by means of test and comparison operators. The particular control structures thus used burden the interpretation process, making it inefficient. However, the realization of generalised methods for information structure recognition on fast technologies (firmware) proves to be difficult, if not altogether impossible.

Furthermore, in both types of devices of the known art there is the disadvantage that the recognition of the communication frames cannot be based on any frame component, but exclusively on frames at a non-application layer.

P. Rolin, L. Toutain and S. Gombault, 'Network Security Probe' discloses a device that provide a security service in a network environment that don't interject the security services into the operational sequences, rather the security services are established as a parallel set of services. The major disadvantage of such a device is that use an optimistic approach: the device let pass all communications and checks in parallel for authorization, illegal communications will be stopped later. Another disadvantage is that the recognition is performed by a "pattern matching" method. This kind of methods are not error-free because are based on the comparison of the parts of the dialog with rules and patterns listed in a database and decided by security officers. Furthermore the performance of the security system depend both on the number of the rules to compare and on the their complexity, then is not possible to completely eliminate the risk that an illegal communication pass on the network.

The present invention overcomes such disadvantages of the prior art, as it provides a network access control device through in series deterministic recognition of application frames satisfying a set of predetermined syntactical rules comprising:

means for monitoring and interpretation of the application frames to recognize;
means for storing predetermined syntactical rules;
means for compiling the predetermined syntactical rules in a direct access data structure;
means for storing said direct access data structure; and
means for comparing the application frames to be recognized with said direct access data structure, whereby the recognition can be performed on any frame component and the direct access data structure allows an access time substantially independent from the number of rules, characterized in that it further comprises forwarding means, for forwarding the application frame when recognized and return-to-sender means, for returning of the application frame when not recognized.

Preferably, the means for monitoring and interpretation of the application frames comprise:

a) a data packets monitoring device at a layer corresponding to the OSI layer 2, said data packets comprising control frames and information frames, wherein the control and information frames contain a header portion and a body portion, said header portion allowing the distinction between an information frame and a control frame;

b) a control unit receiving as an input the data coming from the monitoring device and comprising means for the discrimination of the control frames from the information frames;

c) a dating unit connected to the control unit and associating a monitoring time to the control frames and to the information frames;

d) a discriminated data storing unit, storing the control and the information frames and the monitoring time thereof, bidirectionally connected to the control unit;

e) a predetermined data storing unit, bidirectionally connected to the control unit, said predetermined data representing possible interpretations of the information frames contained in the discriminated data storing unit;

f) means for comparing, by the control unit, said predetermined data stored in the storing unit with the data contained in the body portion of the information frames stored in the discriminated data storing unit, thus reconstructing the information frames according to their specific application syntax;

g) means for ordering, according to the time and kind of communication, the information frames reconstructed according to their specific application syntax, thus reconstructing application sequences occurred between a determined source processor and a determined destination processor; and h) means for ordering said information frames ordered according to the time and kind of communication also according to a logical criterion, thus reconstructing the logical path of said application sequences occurred between a determined source processor and a determined destination processor.

As it is known, a direct network access data structure allows the access to the i-th element without necessarily having to access to the preceding elements, as it occurs instead with sequential access data structures. Known examples of direct access data structures are vectors, matrices, correspondence tables, a memory of a processor etc.

A first advantage of the access control device according to the present invention is given by the flexibility wherewith a recognition pattern can be realized. In fact, by virtue of the use of the apparatus for monitoring and interpretation of application protocols, described in detail herebelow, the recognition of the communication frames can be based on any of the components of the frame, both on the control portion and on the information portion. Therefore, a recognition pattern can be realized (and therefore the access can be restricted) based on the contents of the exchanged information between client and server and not only based on the used network addresses and services.

A second advantage of the device according to the present invention is given by its capability to manage a very high number of patterns (in the order of millions) without any decay in the performances.

In fact, in a context where a high number of users, servers and application services on the same servers is involved, when it is desirable to directly manage (or to control and document) the accessibility of each user to the single server and to the application service thereby provided, the pattern number grows quadratically. For instance, given 1000 users on the territory and 100 servers of which it is desirable to manage and control the accesses, 1000*100=100.000 patterns are generated. This number further increases when it is desirable to manage and/or control the access to the application for each single server, the pattern number growing to the order of the millions in the actual cases on of middle/big-dimensioned structures.

Such a pattern number is by all means acceptable for the device of the present invention.

In fact, the recognition of the acquired communication frames is based on a deterministic access algorithm (hence neither heuristic nor probabilistic) ensuring an access time that is constant and independent (under any input) from the pattern number.

Then the access control device performs for each correctly recognized frame the coordinating operation associated to recognition. As an example, once the recognition has occurred, the device will activate a TCP/IP layer (or layers corresponding to other protocols) communication with the server application individuated as result of the recognition, even a partial one, of the information component of the access frame, providing as parameters part of the already recognized or yet unprocessed information component. The sending modes (parameter sending format, number of parameters to send, application to activate, etc.) are associated to the recognition action and are therefore stored in the patterns.

The access control device according to the present invention can be configured to operate both in positive logic and in negative logic.

In positive logic, all the frames that meet the recognition patterns will be considered as accepted and therefore brought to destination or are subjected to a coordinating, control and/or documentation action.

In negative logic, all the frames that do not meet the recognition patterns will be considered as accepted and therefore brought to destination or shall be subjected to a coordinating, control and/or documentation action. All the recognized frames will not be brought to destination or shall not be subjected to a coordinating, control and/or documentation action.

The present invention will be illustrated herebelow by referring to a preferred embodiment thereof, explained by way of a non-limiting example. Reference to figures of the annexed drawings will be made, wherein.

Figure 11:
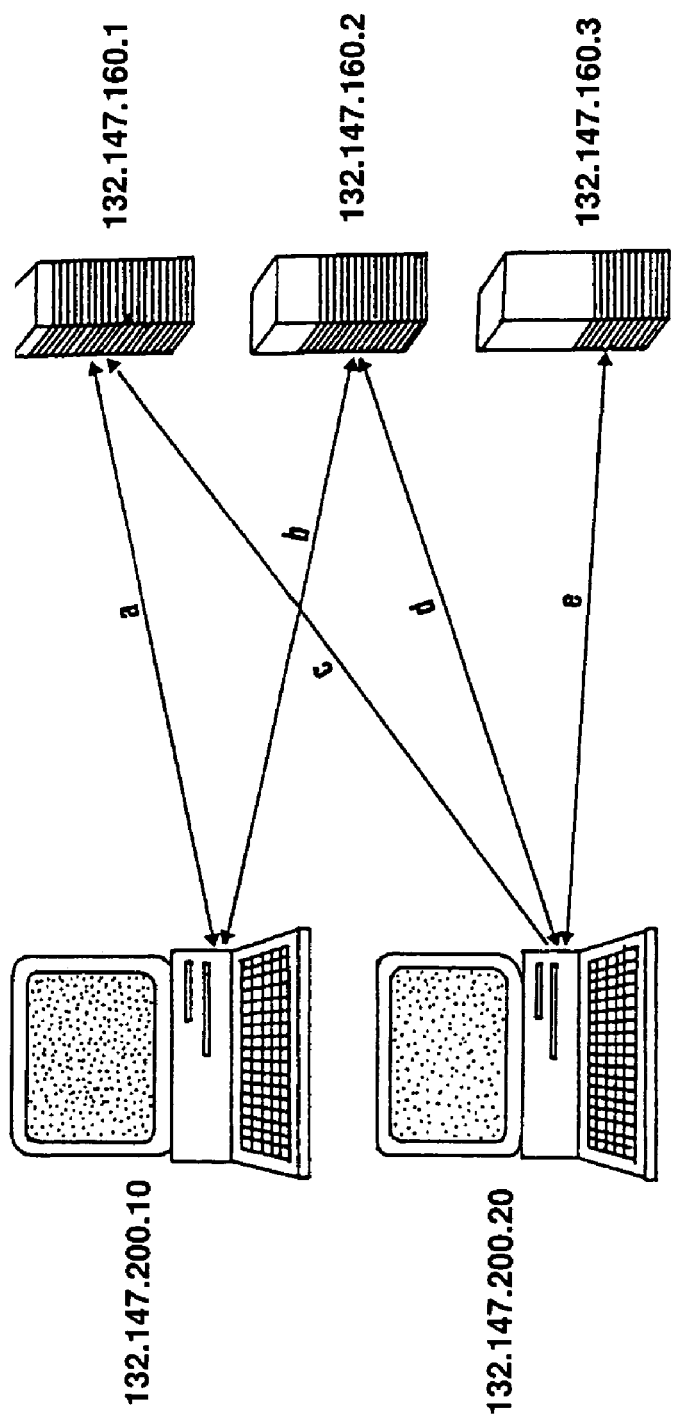

FIG. 11 contains an example of specification of predetermined rules; and

FIG. 12 shows a matricial representation of sequences of numerical identificators.

Data transmission from a source device to a destination device can occur in different manners. However, to ensure a data exchange having the lowest possible chance of errors it is necessary to adopt a series of rules or control procedures. Said rules or procedures are known as "communication protocols".

Figure 1:
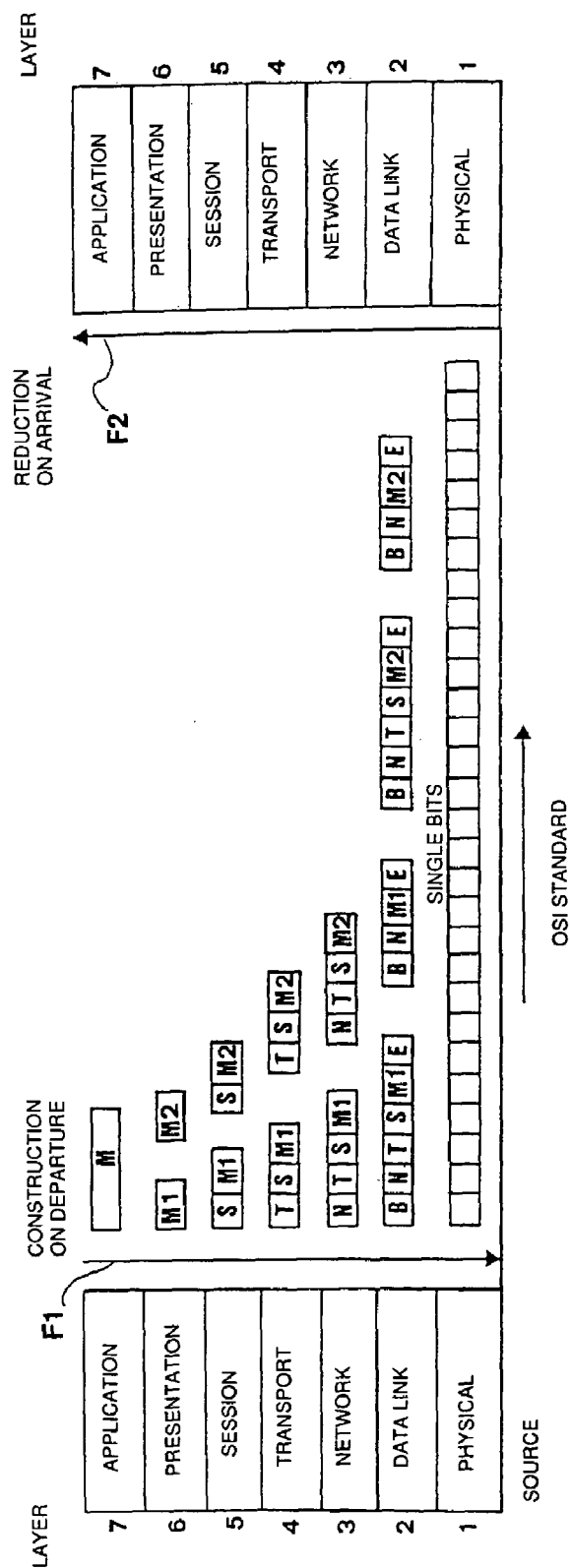
FIG. 1 shows a schematic diagram of the OSI standard.

A well known communication protocol is the "Open System Interconnection" (OSI) of the International Standards Organization (ISO). Said protocol is divided into seven layers, shown in FIG. 1. Layer 7 (application) on the source side contains information related to the sole message (M) to be sent to the destination side. The successive layers on the source side add control information to the message: layer 6 (presentation) divides the data of the original message into blocks (M1 and M2); layer 5 (session) adds a title (S) to indicate the sender, the receiver and some information related to the sequence; layer 4 (transport) adds information (T) related to the logic connection between the sender and the receiver, layer 3 (network) adds information related to the path (N) and divides the message into packets representing the standard communication unit in a network; layer 2 (data link) adds a title portion (B) and a tail portion (E) to the message to ensure the correct order of the various packets and to correct transmission errors; the single message bits and control information bits added by the various layers are transmitted on the physical medium through layer 1. The downward pointing arrow F1 on the sender side indicates the manner according to which the outgoing message is constructed. Every addition to the message is verified and removed from the corresponding layer on the destination side. The upward pointing arrow F2 on the destination side indicates the manner according to which the incoming message is reconstructed.

With reference to the OSI standard, the communication unit in a network is the packet. Packets are in turn divided into frames. The beginning and the end of each frame are usually determined by delimitation characters. The frames are in turn divided into information and control frames. The information frames transport the data relative to the message that is to be transmitted throughout the network, while the control frames deal with the regulating modes of said transport, i.e. the flow control and the starting of the error recovery actions. Both the information and the control frames contain a header portion identifying the frame type and a body portion which is typical of the frame itself.

Figure 2:
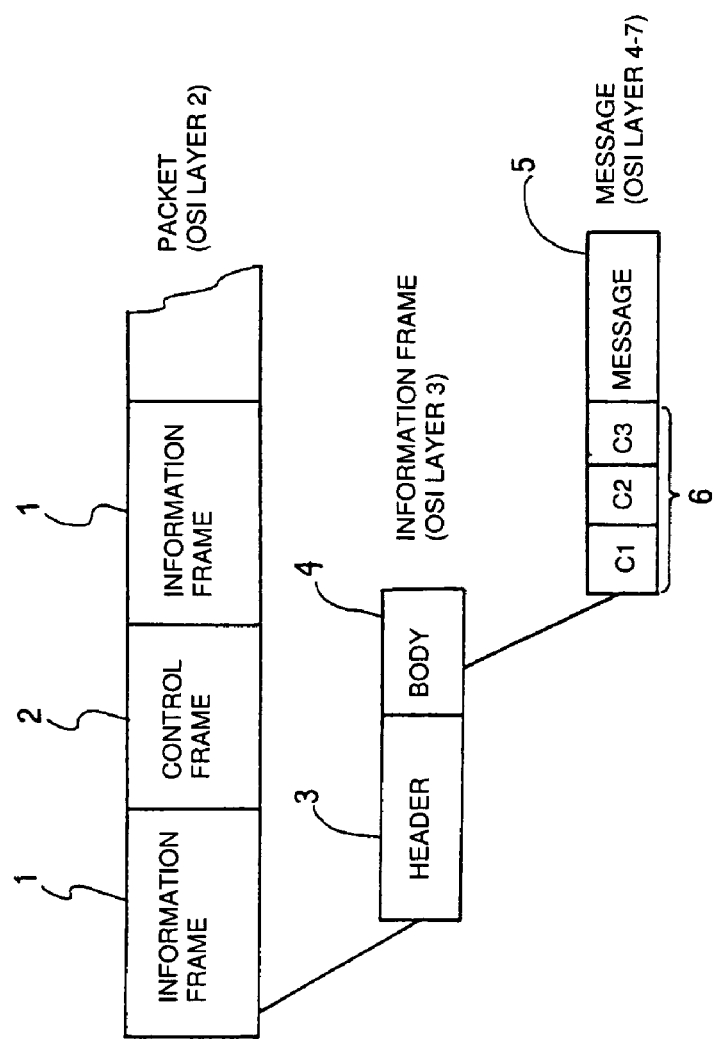
FIG. 2 shows a schematic view of the type of data used on communication networks.

The information frame structure will be described with reference to FIG. 2. In the upper portion of said figure, the generic structure of a OSI layer 2 packet is schematically described, thus comprising both information frames 1 and control frames 2. A single information frame (OSI layer 3) is constituted by a header portion 3, containing the identification that the frame is an information frame, and by a body portion 4. The body portion (OSI layers 4–7) contains the real message 5, together with a plurality of fields 6, typical of the particular application syntax used, illustrated by way of example in the figure with the characters C1, C2 and C3. The application syntax is the information relative to the number of fields contained within the plurality 6, to the meaning of each of said fields and to the data contained therein.

The OSI model schematically described up to this point is just a conceptual model. A typical protocol normally adopted is for example the TCP/IP (Transmission Control Protocol and Internet Protocol). Said protocol, just like other communication protocols adopted, can be explained with reference to the layers structure of the OSI model. In fact, in each of said protocols, a certain source layer will divide the data it receives from an upper layer adding to said data a header and/or a tail and will forward all this to a lower layer. On the destination side the opposite operations will occur.

Figure 3:
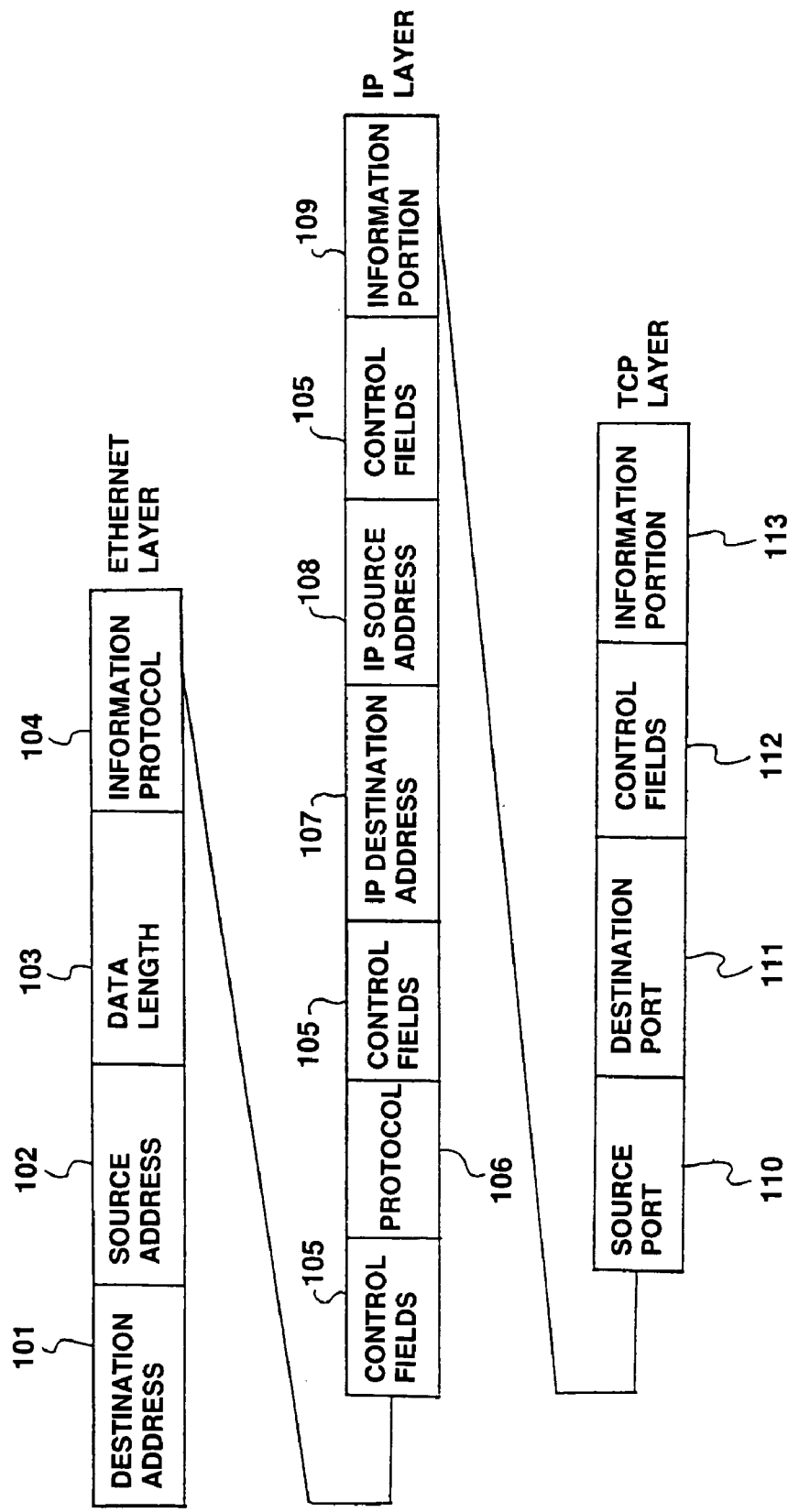
FIG. 3 shows a schematic view of the type of data used on communication networks with reference to the TCP/IP protocol.

With reference to the following FIG. 3, a schematic view is shown of the type of data used on local communication networks with reference to the TCP/IP protocol carrying the HTTP application service (Internet browsing).

The Ethernet Layer substantially includes four kinds of fields:
  a destination network card address field 101;
  a source network card address field 102;
  a communication protocol field 103, in this case indicative of the carried IP protocol and of the length of the information portion; and
  an information field 104, i.e. containing the Ethernet layer data, i.e. the entire structure of the carried IP protocol.

The IP Layer (encapsulated in the Ethernet layer) substantially includes six types of fields:
  a series of control fields 105 identifying the version, the length, the transmission options, the filler etc.;
  a communication protocol field 106, in this case indicative of the TCP protocol;
  an IP destination address field 107, i.e. of the IP address of the packet receiver;
  an IP source address field 108, i.e. of the IP address of the packet sender; and
  an information field 109, i.e. containing all the IP layer data, i.e. the entire structure of the carried TCP protocol.

The TCP layer (encapsulated in the IP layer) includes four types of fields:
  a source port field 110, indicating the TCP service port used by the packet sender;
  a destination port field 111, indicating the TCP service port used by the packet receiver,
  a series of control fields 112 identifying the packet ID, the working window, the crc, various options etc.; and
  an information field 113, i.e. containing the TCP layer data, i.e. the entire structure of the carried HTTP application service, i.e. the HTTP language commands and, in its information part, the HTML language commands.

Monitoring systems for the data transmitted between a sender node and a destination node are already known. However, said systems can only analyze the OSI layers 2 (data link) and 3 (network). The monitoring and the successive interpretation of the data at said layers allow only the monitoring of anomalies in the exchange protocol among the various components of a network data transmission system.

Therefore, a typical disadvantage of said prior art systems is their incapability of decoding the application piece of information transported on the network, i.e. the piece of information related to the layers 4–7 of the OSI standard.

In the following FIGS. 4 to 8B, the structure and the operation of an apparatus for monitoring and interpretation of application protocols will be described in detail.

Figure 4:
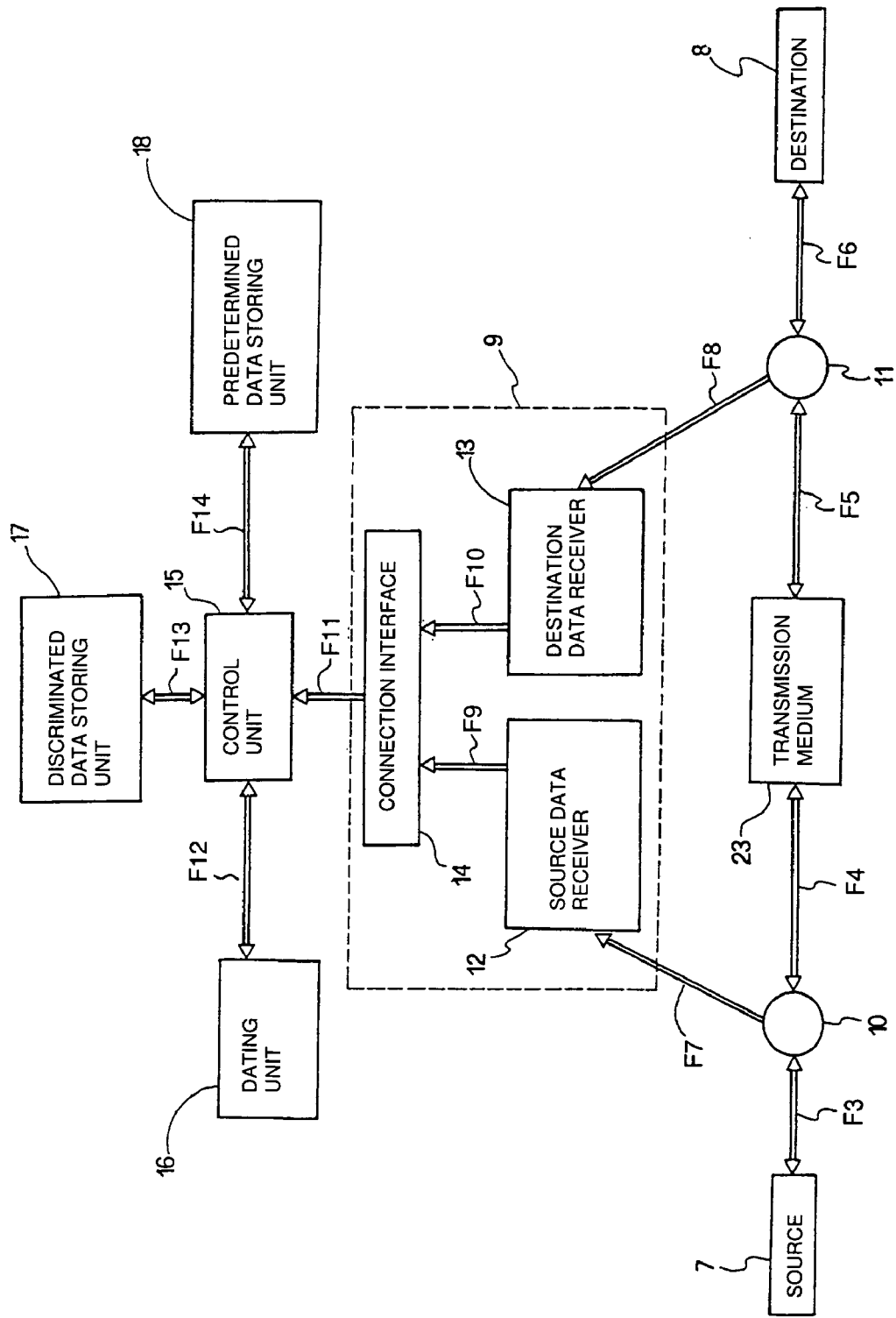
FIG. 4 shows a block diagram of the apparatus for monitoring and interpretation belonging to the access control device according to the present invention.

Reference will now be made to FIG. 4, showing a block diagram of the apparatus. First of all, in said figure a source node 7 and a destination node 8 are shown, terminals of the network portion in which the data are monitored and interpreted. Throughout the connection between said two nodes, schematically illustrated by arrows F3, F4, F5, F6 and by the transmission medium 23, data relative to plural communications between a first set of source processors (not shown in the figure) upstream of the source node 7 and a second set of destination processors (not shown in the figure) downstream of the destination node 8 travel bidirectionally.

Said data are monitored by means of a data monitoring device 9. Several are the monitoring devices known on the market; for instance, concerning networks based on Ethernet technology, the Fast Etherlink XL™ card produced by the company 3Com™ can be mentioned. As for networks based on X.25 technology, e.g. the S508 card produced by the Canadian company Sangoma™ can be mentioned. Such card can operate with different OSI layer 1 (physical layer) standards such as, for example the RS232 (or V.24) standard and the RS422 (or V.35) standard. The OSI layer 2 (data link) standards together with said card can operate are, for instance, the HDLC standard, or the X.25 standard, contained therein. Anyway, the kind of data monitoring device 9 to be selected for the purposes of the present invention can vary depending on which OSI layers 1 or 2 standards one needs to operate. In fact, it will be possible to use monitoring devices working with implementation standards different from the OSI layer 2, such as for example "Frame Relay" or SDLC or also BSC and the like. Said devices are well known to the person skilled in the art and will not be here described in detail.

The monitoring occurs "transparently" by means of two parallel connectors 10 and 11, schematically illustrated in the figure, allowing the monitoring of the data coming respectively from the source node 7 and from the destination node 8. The monitoring device 9, shown by the dashed block in the figure, includes a source data receiver 12, a destination data receiver 13 and a connection interface 14. The source data receiver 12 allows the reception of the data coming from the source node 7 only, as it is schematically indicated with the arrow F7; on the other hand, the destination data receiver 13 allows the reception of the data coming from destination node 8 only as schematically indicated with the arrow F8. The data received in this manner are transmitted to the connection interface 14, as it is indicated by the arrows F9 and F10.

Each data packet situated at a layer corresponding to the OSI layer 2 read by the monitoring unit 9 is forwarded to a control unit 15, as indicated by arrow F11. The control unit 15 will be described in detail later. To each of said packets a reading time is associated by means of a dating unit 16, represented outside the control unit 15 for ease of description and therewith connected as indicated by arrow F12. Such dating unit 16 can be any absolute time device on the market, in particular a radio or a satellite one. In a preferred embodiment of the present invention a radio controlled digital clock adjusted on the CET (Central European Time) broadcast by geostationary satellite was used.

Further to the association of the reading time by means of the dating unit 16, the control unit 15 discriminates the single frame so as to reconstruct the right logic/temporal forwarding sequence of the frames that, as it is known, does not always coincide with the received sequence: in fact, due to the routing techniques on telecommunications networks, it is possible for a forwarded sequence of the "ABC" type to be received in each of its possible permutations, i.e. "ABC", "ACB", "BAC", "BCA", "CAB", "CBA". Therefore, the control unit 15 discriminates the information frames from the control frames. For example, if transmission of the information occurs in the HDLC format, the last bit of the header portion of the information frame is 0 whereas the last bit of the header portion of a control frame is 1. Therefore, inside the control unit 15 there are means, not described in the figure, discriminating said last bit, e.g. a firmware contained in a ROM. In any case, no matter which data transmission code is used, the modes discriminating a control frame from a information frames will always be known. Therefore, it will always be possible to provide means for said discrimination. Such discrimination thus allows the storage of the single information frame deprived of the header portion and comprising the body portion only, thus containing the information which is typical of the particular application syntax used, together with the message to be transmitted.

The data incorporating the monitoring time and divided into information frames and control frames are stored inside a discriminated data storing unit 17, bidirectionally connected to the control unit 15 as indicated by arrow F13. There is also a predetermined data storing unit 18, bidirectionally connected to the control unit 15. Said predetermined data represent possible interpretations of the information or control frames contained in the discriminated data storing unit 17. Their use will be explained herebelow with reference to the following figures. The connection between the predetermined data storing unit 18 and the control unit 15 is indicated by arrow F14.

Figure 5:
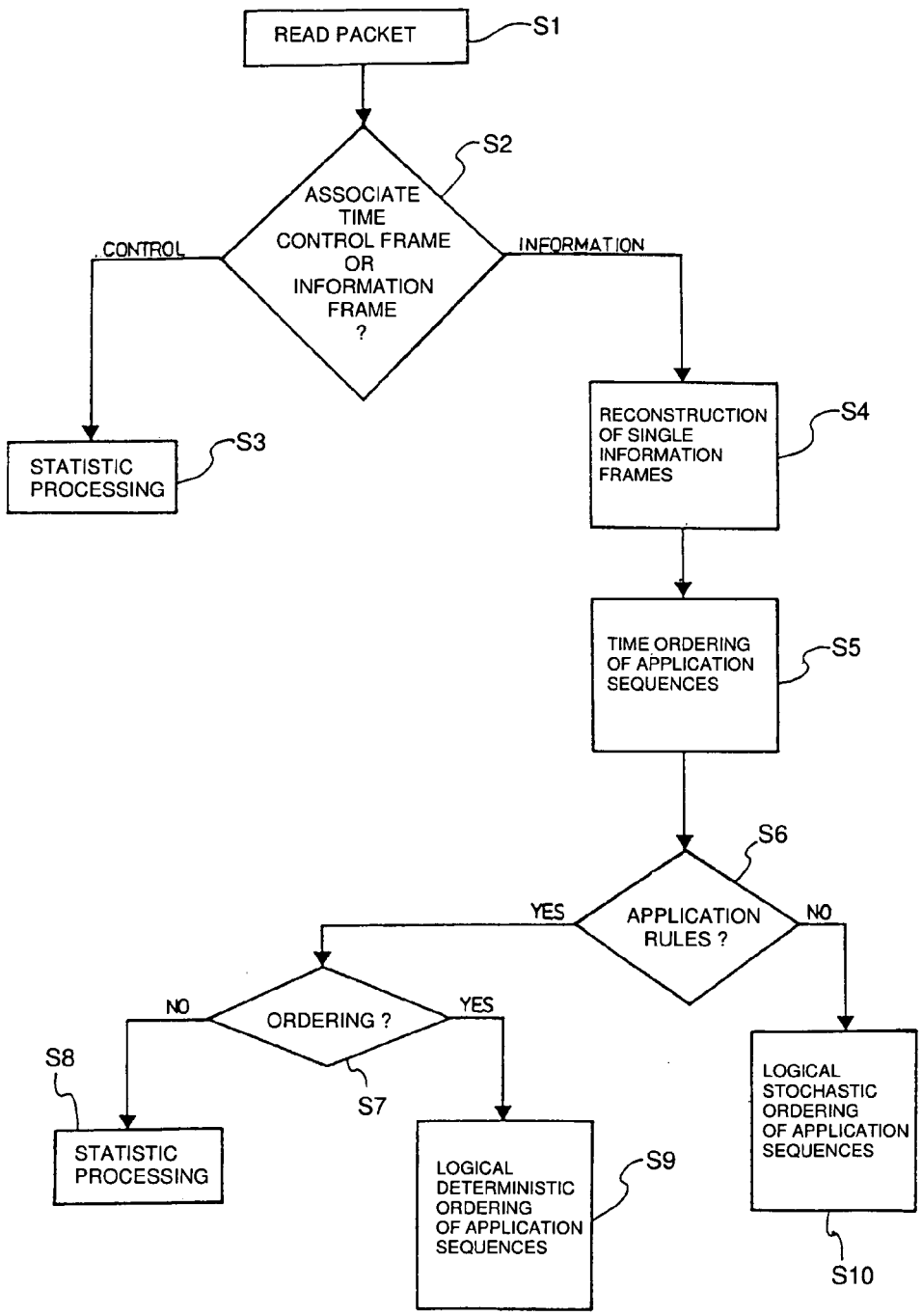
FIG. 5 shows a flow chart explaining the operation of the component in FIG. 4.

Reference will now be made to FIG. 5, showing a flow chart indicating the operations executed by the control unit 15 on the information frames stored in the discriminated data storing unit 17. The access to such information frame is intended to be selectively regulated by authorizations and privileges management systems such as passwords, encryption and decryption codes, badge readers and the like given to qualified users.

A first step S1 indicates the reading of the various packets by the monitoring unit 3. A second step S2 indicates the previously described discrimination operated by the control unit 15 between the information frames and the control frames, together with the association of the monitoring time.

On the non-application low layer control frames, whose use is marginal for the purposes of the present invention, a statistic processing might also be provided, operated in the step S3. Said processing is not described in detail at the moment; the modes by which it occurs will turn out to be clear at the end of the present description. The final result of such processing will provide a list of the control frames, reporting also the number of occurrences for each of said frames.

As for the information frames, the flow proceeds to a step S4 in which the single information frames are reconstructed according to their specific application syntax. To the purposes of said reconstruction, the application syntax structures of the single information frames must be known. In fact, they are contained inside the predetermined data storing unit 18 described with reference to the previous FIG. 3. Said unit 18 contains, for example in a text file, a formal abstract description for possible interpretations of the information or control frames. Said data represent the modes according to which the body portion of a single information frame can be structured, for example the machine transmission code (i.e. related to an information frame forwarded by the source or the destination), the number of the channel (i.e. related to a specific processor upstream of the source node or to a specific processor downstream of the destination node), protocol numbers, data processing numbers etc. Said unit 18 can of course contain the syntax of several application protocols of the information frames that are to be reconstructed in that moment.

A reconstruction of the information frames one by one is obtained by a sequential comparison of the body portion of each information frame with each one of the abstract models in the unit 18.

Further to this, the different application sequences occurred between a determined source processor and a determined destination processor can be reconstructed, i.e. ordered according to time and kind of communication. Throughout the present description, for application sequence will be intended the whole of the information frames exchanged between a determined source processor and a determined destination processor during a single communication. The application sequence ordered in step S5 will contain the single information frames ordered according to a time criterion only and not also to a logic one. Ordering by time will be possible through the time association occurred in the previous step S2.

To give also a logical ordering of the data inside a specific application sequence, the presence of a group of application rules directing the data exchange between source and destination can be useful, although not necessary. Said application rules, typical of the particular kind of conversation between a determined source processor and a determined destination processor, must be predetermined and as such, they as well are collected in the predetermined data storing unit 18. Said application rules are a series of possible interpretations of the information frames sequences contained in the discriminated data storing unit 17.

An example of such application rules is given by table 1 herebelow, wherein reference is made to a communication between a source representing a student (client) wanting to enroll to university via terminal, and a destination (server) representing the university where the student wants to enroll.

TABLE 1

1: AS ? FDB 15 AS ? FDB 5 AS ? FDB 0
The enrollment booking was regularly acquired
2: AS ? FDB 13 AS ? FDB 0
The client position is not regular
. . .
. . .
. . .

Every row of said table is an application rule, indicating i.e. a possible data exchange application sequence between source and destination. The meaning of each application sequence is illustrated herebelow. For example, the first row indicates the following sequence of information frames:

the source (AS) interrogates (?) the destination;
the destination (FDB) answers with the activity number 15;
the source (AS) interrogates (?) again the destination;
the destination (FDB) answers with the activity number 5;
the source (AS) interrogates (?) the destination; and
the destination (FDB) answers with the activity number 0.

The result obtained at the end of this conversation is that the booking for the university enrollment is regularly acquired.

The structure of Table 1 is a mere example and it could also be illustrated with a tree structure having a number of branches depending on the number of application sequences provided. Every path down to one of the tree leaves would illustrate a particular application sequence, i.e. a particular conversation between source and destination, i.e. a particular information frame sequence between source and destination.

The number of application rules can be anyone. The larger the number of application rules provided, the bigger the chance to associate each of the application sequences temporally reconstructed in the step S5 with a well defined logic meaning, found by comparison with a particular application rule contained in the predetermined data storing unit 18 in FIG. 3. Therefore, in this manner it will be possible to verify the correctness or the anomaly of the particular application sequence that is being compared in that moment.

In the step S6 in FIG. 5 the control unit 15 verifies first of all whether such application rules be available or less. Supposing that said application rules are known, the flow can proceed either toward a step S8 or toward a step S9, depending on what was chosen in the step S7. The step S8 allows a simple classification of the application sequences. In fact, each application sequence is classified as belonging to a particular path among the various possible paths inside the application rules tree. The step S8 will be explained in greater detail with reference to the following FIG. 6.

On the other hand, in the step S9 the logical path of all the application sequences monitored by the apparatus in a predetermined time interval is reconstructed. Said step S9 will be described in greater detail with reference to the following FIG. 7.

The apparatus according to the present invention allows a reconstruction of the logical path of the application sequences also if a series of application rules is not provided. In this event, the flow proceeds to a step S10, that will also be described later.

Figure 6:
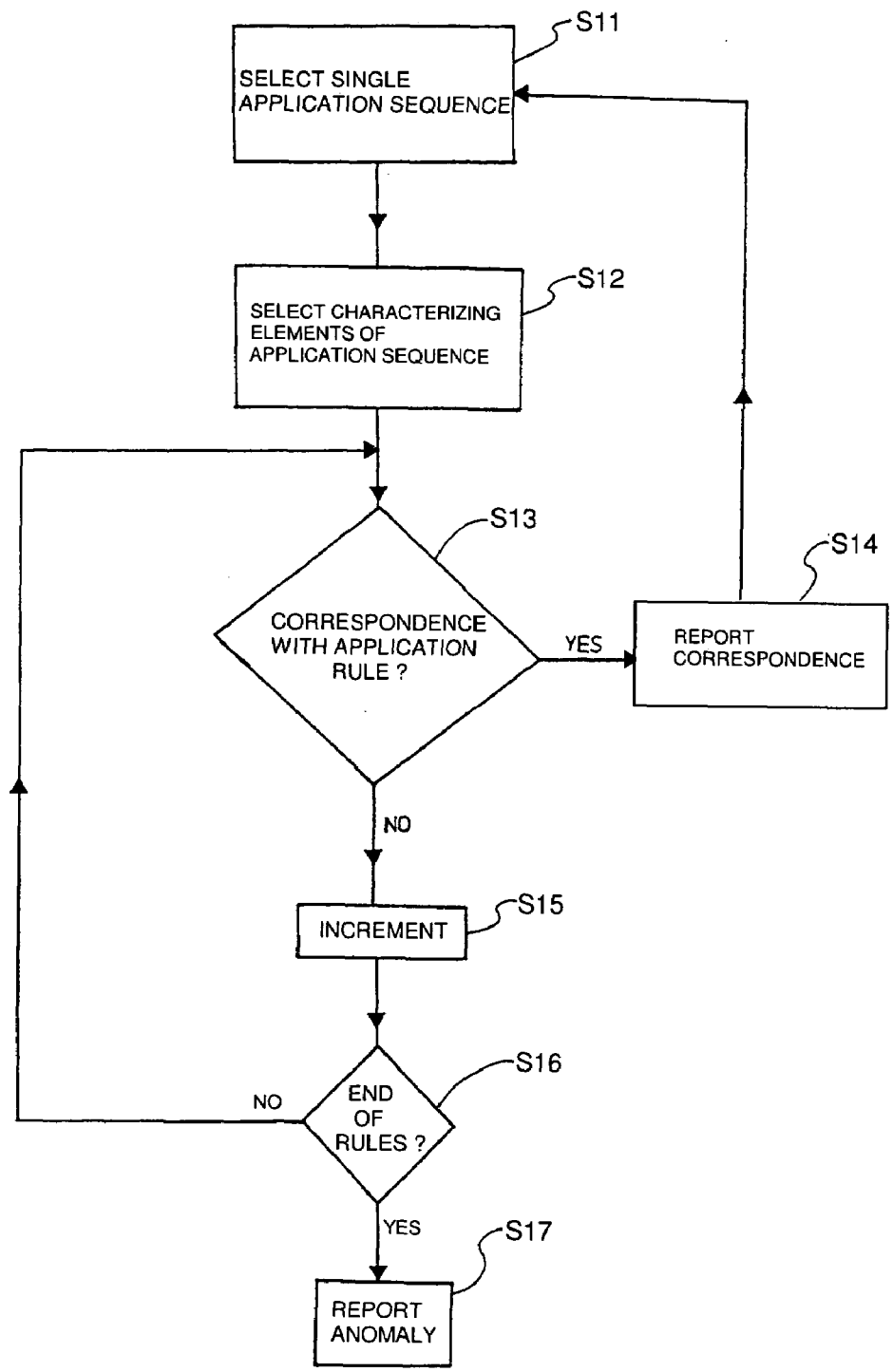
FIGS. 6 and 7 show additional flow charts for the understanding of what disclosed with reference to FIG. 5.
Figure 7:
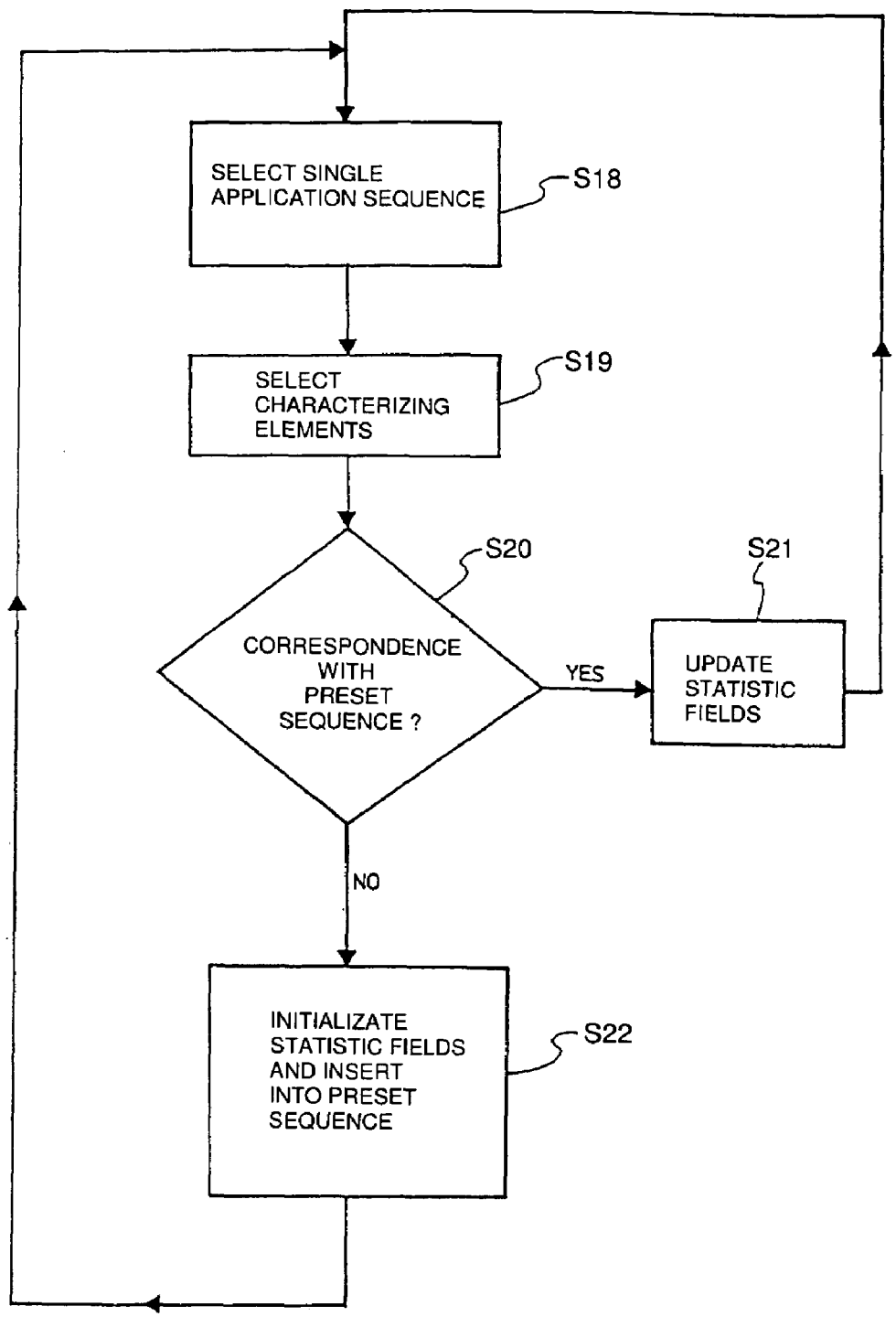
Figure 8:
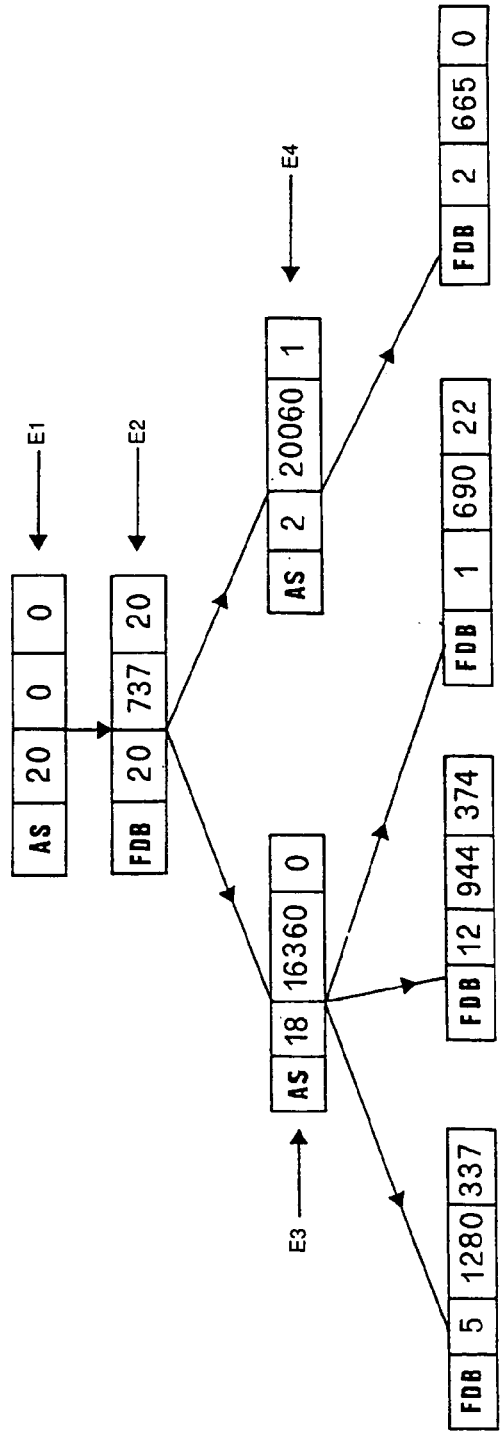
FIGS. 8A and 8B show an example of application tree containing statistic information obtained by means of the component in FIG. 4.

Reference will now be made to FIG. 6, which provides a more detailed explanation of what previously described with reference to step S8 of FIG. 5. In a first step S11 the single application sequence, object of the comparison, is selected. In a successive step S12, the elements which are characterizing for comparison purposes are selected inside the selected application sequence.

In the example of the enrollment to university previously described in table 1 said characterizing elements might be: the identification number of the source processor, the identification number of the user who required the enrollment operation, the data provided by the source and the data provided by the destination.

In the step S13 the characterizing elements of the considered application sequence are compared with one of the application rules of the above described table 1 searching for a possible correspondence. If such a correspondence is found, the flow proceeds to a step S14 wherein said correspondence is reported and will have to be taken into consideration in the results of the interpretation. Then the flow selects another sequence and executes again the step S11. If the correspondence at the step S13 is not found, the control unit 15 goes in step S15 to a subsequent rule and if (step S16) there are still rules allowing a comparison the control unit executes once again the comparison of step S13. If no further rules are found, the control unit reports an anomaly in the step S17. Such an anomaly might alternatively mean:

either a kind of sequence which should not have occurred (a real anomaly); or
a kind of sequence not inserted by mistake inside the application rules tree.

In each of said events, finding such an anomaly is certainly useful for the certification of the kinds of application sequences occurred in the network portion under examination.

Reference will now be made to the following FIG. 6 which gives a more detailed explanation of what described in the step S9 in FIG. 5.

The steps S18 and S19 select respectively the single application sequence and the characterizing elements of the same, similarly to what described with reference to the previous FIG. 5. The step S20 is to indicate the comparison between the application sequence and the preset application rules contained inside the predetermined data storing unit 18. If a correspondence is found, the flow proceeds to a step S21 wherein the correspondence found is taken into consideration through the update of the related statistic fields. Steps S18–S20 will be subsequently repeated, until the end of the sequences to be classified. If no correspondence is found, the application sequence to be classified is new; it can be an anomaly or simply an unexpected sequence. In this event, the flow proceeds to a step S22 wherein the statistic fields related to that specific sequence are initialized. Furthermore, the new sequence will be inserted in the list of the preset sequences that are to be used for the comparison in the step S20. This is also indicated by the double pointing of the arrow F14 in the previous FIG. 4. Said particular sequences, i.e. the possible anomalies, can be evidenced in a particular manner to be recognized as such. Further to this, also in this case the steps S18–S20 are repeated until the end of the sequences to be classified. In particular, besides the number of crossings for each tree branch, it is also possible to monitor uncrossed branches.

In case there is no preset sequence of application rules, it will always be possible for the control unit to reconstruct the communication applications occurred in the network portion under control (step S9 in FIG. 5). In this event each analyzed application sequence will not be compared with the preset sequences, but with the previously analyzed sequences. Therefore, the tree structure containing statistic information will be reconstructed by reciprocal comparison of the body portion of the information frames. Also in this case, a tree will be constructed and it will be possible to know the number of crossings for each branch. Obviously, in this case it will not be possible to monitor the uncrossed branches as there will not be a prior knowledge of the existence of said branches.

Reference will now be made to FIGS. 8A and 8B showing respectively an example of an information frame and an example of a tree structure containing statistic information obtained by means of the apparatus according to the present invention.

In FIG. 8A it is possible to notice four different fields: a first field 19 indicating the name of the source or destination processor, a second field 20 indicating the number of connections in the monitored time interval, a third field 21 indicating the average time length of each connection, counted for example in milliseconds, and a fourth field 22 indicating the code of the activity executed.

FIG. 8B indicates the reconstructed tree. A first element E1 in the tree indicates that AS (source) connected 20 times, with an average connection time of 0 milliseconds (simple opening of the connection with the destination) and executed the activity with the code 0. A second element E2, E1's only "son", indicates that in all those 20 connections FDB (destination) answered with the activity having the code 20, with an average connection time of 20 milliseconds. There were two manners of proceeding. AS answered for 18 times (element E3) with the activity 0 and twice (element E4) with the activity 1. The tree proceeds with other elements, whose meaning is now clarified by the context. The tree herewith disclosed is the result of the logical ordering operated in the steps S9 or S10 in FIG. 5.

It is to be noted that the monitoring of the contents in the fields 19 and 22 of each element was operated in the step S4 in FIG. 5. The monitoring of the connections among the various elements, i.e. the fact that the element E2 is E1's "son" and that the elements E3 and E4 are E2's "sons" was operated either in the step S9 or in the step S10 in FIG. 5.

The data flow relating to a particular application intercurred between one or more determined processors upstream of a source node and one or more determined processors downstream of a destination node can be therefore reconstructed, in the sense of univocally determined in all its component parts. Therefore, what is reconstructed is the conversation relating to one or more client/server applications. The logical reconstruction can take the form of the tree structure of FIG. 8B. Thus, communications relating to different applications (which therefore originate different application trees) can be reconstructed, and on the same source processor also more client-applications (relating to different server-applications) can be present. In the same way, on a destination processor more server applications can be present.

Having ended the detailed description of an apparatus for monitoring and interpretation of network application protocols, herebelow the structure and the operation of the remaining components of the network access monitoring device according to the present invention will be described in detail.

The preferred connection mode of said device is a series connection, on Ethernet networks for 10 Mbits (connectors ij58 and rj45) and for 100 Mbits (rj45) or more.

The OSI layer 2 supported protocols will be all the protocols encapsulated in Ethernet, like 802.3, DOD IP, ARP etc.

The OSI layer 3 supported protocols will be all the protocols encapsulated in the various OSI layer 2 protocols, like TCP/IP, UDP/IP, Netbios/IEEE 802.3, SNA/IEEE 802.3 etc.

Figure 9:
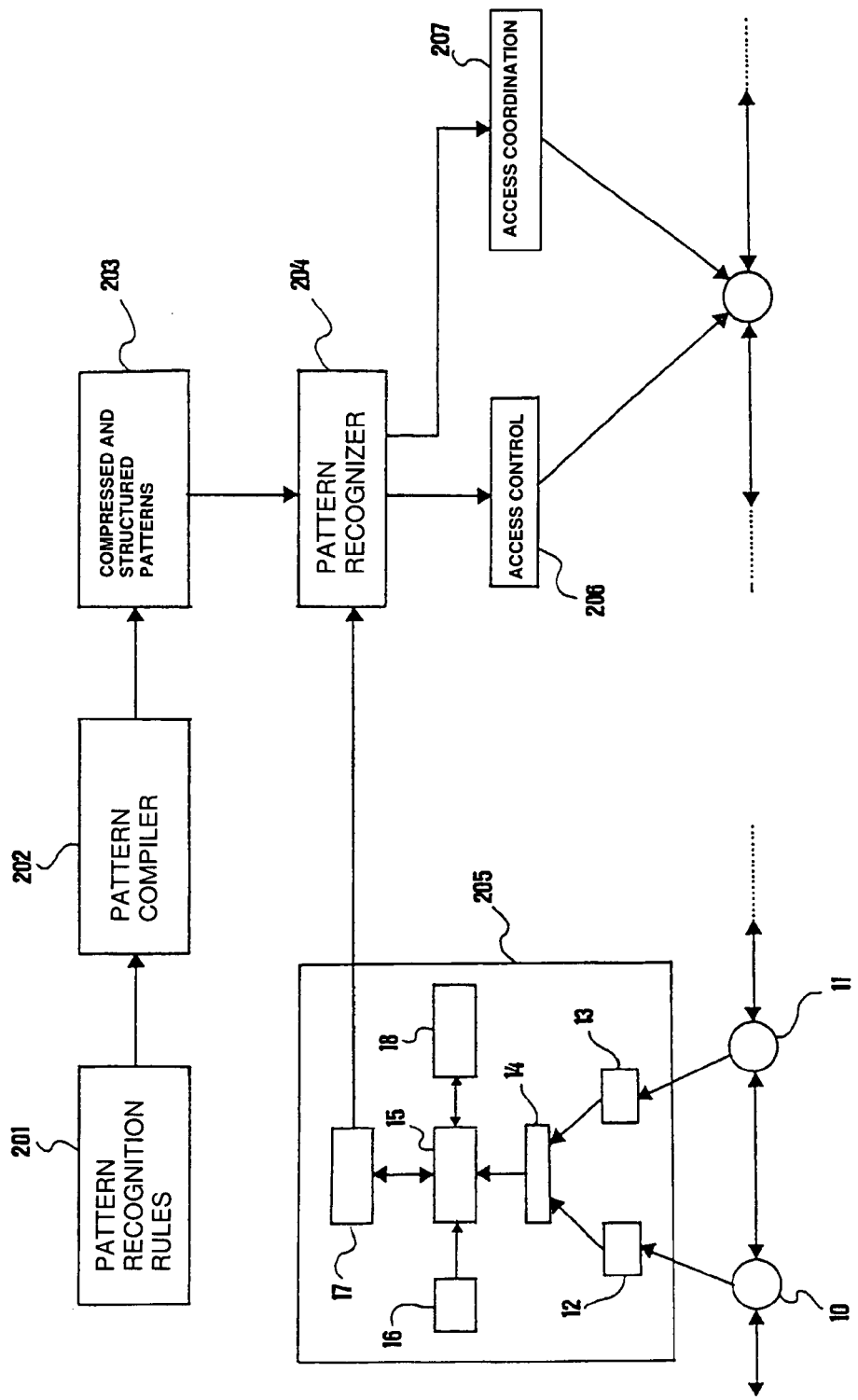
FIG. 9 shows a block diagram of the access control device according to the present invention.

First of all, reference will be made to FIG. 9, showing a block diagram of the access control device according to the present invention. The various blocks in FIG. 9 will be described herebelow one at a time.

Element 201:

It is the element storing the pattern recognition rules. The archive of the recognition rules is created reading a file or, e.g. directly typing in the rules through the keyboard.

Firstly, it should be assumed that said recognition rules are indicated as <data type>/<data value> pairs.

For instance, a recognition pattern of an Internet browsing request by a client with the address 192.23.40.1 to a web server of address 210.20.20.6 has the following structure:

(ETH_PROT, IP),
(IP_SRC_ADDR, 192.23.40.1),
(IP_DST_ADDR, 210.20.20.6),
(TCP_DST_PORT, HTTP)

wherein:

the first pair ($ETH_{13}$ PROT, IP) indicates that the protocol contained in the Ethernet layer must be the IP protocol;

the second pair (IP_SRC_ADDR, 192.23.40.1) indicates that the IP address of the packet sender must be the one indicated;

the third pair (IP_DST_ADDR, 210.20.20.6) indicates that the IP address of the packet receiver must be the one indicated; and the fourth pair (TCP_DST_PORT, HTTP) indicates that the TCP service used is the HTTP (web) one.

The identification numbers on the right of the pairs can also assume values that are not predetermined, for instance if it is desirable to identify all the addresses of a subnetwork. In this case the address of the previous example can be expressed as 210.20.20.* where the symbol * (asterisk) indicates a joker value, i.e. all the possible values that can be in that position. In the same pair two or more asterisks may appear: e.g., 210.*.20.*, thus indicating a set of 65536 (or more) different addresses. Other accepted configurations are e.g.: 2*.20.20.* indicating all the addresses beginning with 2 and ending with a subaddress comprised between 0 and 255 (in this case a total of 100*256=25600 different addresses).

A further example of a recognition pattern for the IBM NetBios protocol between two processors is the following:

(ETH_PROT, IEEE802),
(IEEE802_DST_SAP, IBM_NETBIOS)

When wishing to force the recognition of the network cards involved in the NetBios communication (6 bytes, including the card issuer code and the card number), the pattern becomes:

(ETH_SRC_ADDR, 0xFF45DE782201),
(ETH_DST_ADDR, 0xF237C811000F),
(ETH_PROT, IEEE802),
(IEEE802_DST_SAP, IBM_NETBIOS).

Element 202:

It is the pattern compiler, consisting of a conversion element for converting the rules contained in 201 into a set of sequences of numerical identificators and consisting of a compression element for compressing the identificators thus obtained.

i) Conversion Element

The recognition rules appearing as <data type>/<data value> pairs are converted into sequences of numerical identificators, constituting the basis for the recognition of the frames read from the network.

For instance, given the rule (ETH_PROT, IP),
(IP_SRC_ADDR, 228.186.33.90),
(IP_DST_ADDR, 41.240.227.149),
(TCP_DST_PORT, HTTP)

it follows that:

a) the first pair (ETH_PROT, IP) is converted into two hexadecimal data pairs (in which the 0x prefix indicates that the subsequent value is represented in hexadecimal):

0x0C 0x0800
0x49 0x06 wherein:

the first row contains two values, 0C and 0800. The digit farther left of the first value (0) identifies an Ethernet frame. The second digit of the first value (C) indicates the position inside the frame(13th byte, considering the first one to be in position 0). The second value (0800) is the identification code of the IP protocol when contained in an Ethernet frame; and the second row contains two values, 49 and 06. The digit farther left of the second value (4) identifies an IP net. The second digit of the first value (9) indicates the position inside the net. The second value (06) identifies the TCP protocol contained in IP.

b) the second pair (IP_SRC_ADDR, 228.186.33.90) is converted into four hexadecimal data pairs:

0x4C 0xe4
0x4D 0xba
0x4E 0x21
0x4F 0x5a wherein each pair indicates respectively the IP frame(4), the position (from C to F) and the value of each single element constituting the source address: in fact e4 in hexadecimal corresponds to 228 in decimal, ba in hexadecimal corresponds to 186 in decimal, 21 in hexadecimal corresponds to 33 in decimal and 5a in hexadecimal corresponds to 90 in decimal.

c) the third pair (IP_DST_ADDR, 41.240.227.149) is converted into four hexadecimal data pairs:

0x410 0x29
0x411 0xF0
0x412 0xE3
0x413 0x95 wherein each pair indicates respectively the IP frame(4), the position (from 10 to 13) and the value of each single element constituting the destination address: in fact 29 in hexadecimal corresponds to 41 in decimal, F0 in hexadecimal corresponds to 240 in decimal, E3 in hexadecimal corresponds to 227 in decimal and 95 in hexadecimal corresponds to 149 in decimal.

d) the fourth pair (TCP_DST_PORT, HTTP) is converted into a pair of hexadecimal data:

0x82 0x0080 in which the digit farther left of the first value (8) indicates the TCP frame, the second digit of the first value (2) indicates the position inside said fame (the third starting from zero) whereas the second value 0080 indicates the HTTP service (the one used by web applications).

Therefore, starting from rule
(ETH_PROT, IP),
(IP_SRC_ADDR, 228.186.33.90),
(IP_DST_ADDR, 41.240.227.149),
(TCP_DST_PORT, HTTP)
the sequence
0x0C 0x0800, 0x49 0x06, 0x4C 0xe4, 0x4D 0xba, 0x4E 0x21, 0x4F 0x5a, 0x410 0x29, 0x411 0xf0, 0x412 0xe3, 0x413 0x95, 0x82 0x0080
is obtained.

It is intended that all the conversions hereto described are made possible through a sequential comparison of each of the <data type>/<data value> pairs with a table storing all possible <data type>/<data value> pairs together with the corresponding hexadecimal data pair.

Actually, a more extended form can be used for the rules thus defined, capable of being semantically represented by the <object>/<action> pair. The <object> field indicates the set of properties (including the value) assumed by the element currently under examination, whereas the <action> field expresses the actions that are to be executed after having recognized said object in the communication frame.

For instance, in the hexadecimal pairs of the <data type>/<data value> kind it is apparent how the <data type> field contains a double information, i.e. both the protocol (or the frame type) to which reference is made, and the position inside said protocol.

In the event of complex application protocols, the monitored frames are usually represented by means of a language of the LL(1) type (i.e., according to the definition of Chomsky, a language having no control structures and with no limitations for the definition of the interpretation processes of the information structures). In this event, the <action> field will make reference to a minimal set of basic instructions reported herebelow:

Push
<value>
<variable>
<reading position>
<value at the reading position>
Pop
<variable>
<reading position>
<in the reading position>
And
Mul
Add
Equal
Next
F_send_all
F_dynamic Herebelow a schematic outline of the meaning of said basic instructions is provided for sake of completeness.

Push <value> inserts a value in the stack dedicated to the recognition process under way, for instance: PUSH(35), the value 35 is inserted in the stack;

Push <variable> inserts the content of a variable in the stack dedicated to the recognition process under way, for instance: PUSH(v12), if the value of the "v12" variable is 8, then 8 is inserted in the stack;

Push <reading position> inserts in the stack dedicated to the recognition process under way the position of the value currently read in the input stream, for instance PUSH(pos) if the value of pos, a variable indicating the reading position, is 5, then 5 is inserted in the stack;

Push <value at the reading position> inserts the value read in the input stream under recognition in the "reading position" in the stack dedicated to the recognition process under way, e.g. PUSH(v_pos), if the value of pos, a variable indicating the reading position, is 5 and if at position 5 of the input stream there is the value 30, then 30 is inserted in the stack;

Pop <variable> inserts the stack head in the "variable" variable e.g. POP(v3), if the value 10 was inserted in the stack head, meaning that the last operation performed with the stack was e.g. push(10), then the value 10 goes into the "v3" variable;

Pop <reading position> inserts the stack head in the variable indicating the successive position to be read in the input stream, e.g. POP(pos), if in the stack head the value 10 has been inserted, then the next element that will be read by the input stream will be the one in position 10;

Pop <in the reading position> inserts the stack head in the position indicated by the variable indicating the next position to be read in the input stream, e.g. POP(v_pos), if the value 10 has been inserted in the stack head, the value of the next element that will be read by the input stream will be 10;

And, Mul, Add, Or, Sub are all logical and arithmetical operations. The operation is performed on the values contained in the first two stack positions, the result becomes the stack head and the two used values are removed from the stack; example: the logical arithmetical operations follow the reversed Polish notation (RPN). It is now supposed to have to execute the operation 10*30 to be executed: the entailed program will be:

PUSH(10)
PUSH(30)
MUL now, in the stack head there is 300=30*10.

Equal <value>, Equal <variable>, Equal <reading position>, Equal <value at the reading position> verifies whether in the stack head there is a value equal to the one forwarded as a parameter. The result (0 if different, 1 if equal) is inserted in the stack head;

f_send_all is a function that, when operated, reports the entire input stream to the output;

Next <value>, Next <variable> increments of the value contained in "value" or of the value contained in "variable" the variable indicating the input stream position from which the next value is to be read; lastly f_dynamic("tname") operates the "name" function connected to the coordinating element through dynamic connection mechanisms (as DLL in Windows or shared_libraries in UNIX, or RPC/DCE mechanisms, . . . ) forwarding thereto the values contained in the stack as parameters.

A possible implementation syntax (adopted from C language) of the set of the <item>/<action> pairs can be the following one:

```
typedef struct _item {
        unsigned char object;
        unsigned long int action;
} Item;
typedef struct _record {
        int num_of_items;
        Item * items;
} Record;
```

Record * input_second_step;
wherein:

the "object" field is expressed as a single byte ("unsigned char"). Such a choice does not entail limitations, since an entire value (2 to 4 bytes long) can be considered as a sequence of bytes and therefore it can be processed one byte at the time; and the field "action" is expressed as "unsigned long int". Hence, it can represent both a number (compatible with the first notation) and a pointer to a structure or to a set of functions (compatible with the second notation).

Usually the number of different sequences is very high. By way of example, taking into consideration exclusively the TCP-IP protocol, for a relatively low number of 1000 "clients" (i.e. of processors using application services made available by other processors) and of 10 "servers" (i.e. of processors providing application services to the clients) and of an average of 10 application services per "server" (as e.g. FTP, TELNET, HTTP, MAIL, NFS, TIME, DNS), in order to discriminate all the possible "pairings" among client-server-service, rules indicating 1000*10*10=100000 different pattern sequences in the communication frames have to be determined.

This number, already well above the dimension deeemed acceptable for the internal addressing tables of the routers and of the commercial firewalls, increases very rapidly when rules operating not merely at the level of a control portion of the communication protocols, but operating on the level of the data portion as well are determined, as is the case in the present invention.

The above defined language of rules allows to write rules allowing the identification of elements of the data portion of the communication protocol: in fact, if not merely the "identification" of a "client" is desirable, but also when he tries to access a specific WEB page from a network (which is possible by means of the present invention), it is not enough to operate at a level of the communication protocol control portion (only the fact that a command was sent at the level of an HTTP service would be recognized) being it necessary instead to operate at a level of the TCP-IP protocol data portion in order to identify the particular string determining access to the WEB page requested by the client.

In Annex A a second example of language is reported.

ii) Compression Element of the Set of Sequences Obtained in a Direct Access Data Structure Said second element of the pattern compiler 202 allows a construction of the compression data structure ensuring a constant access time (i.e., regardless of the number of sequences) and an optimal memory occupation (i.e., equal to the amount of memory required to store sequences in a non structured way multiplied for a constant value) for recognition of the sequences stored in said structure in the communication frames that are readable from a network. Moreover it is possible to update such a data structure in a number of steps proportional to N*log(N), where N is the number of new sequences to be inserted.

In particular, reference will be made to the articles:

a) "Time Optimal Digraph Browsing on a Sparse Representation", Mathematics Department Tech. Report, Tor Vergata University of Rome 8/97, 1997 by M. Talamo and P. Vocca;

b) "Optimal Bounds on Complexity of Sparse Partial Orders", Mathematics Department Tech. Report, Tor Vergata University of Rome, 9/97, 1997 by M. Talamo and P. Vocca;

c) "Optimal Digraph Search on a Compressed Representation", Mathematics Department Tech. Report, Tor Vergata University of Rome, 11/98, 1998 by M. Talamo and P. Vocca; and d) "Compact Implicit Representation of Graphs", WG98 proceedings, June 1998 by M. Talamo and P. Vocca In said articles data structures allowing a constant time access, i.e. regardless of the number of data represented by them, are described.

Figures 10A, 10B:
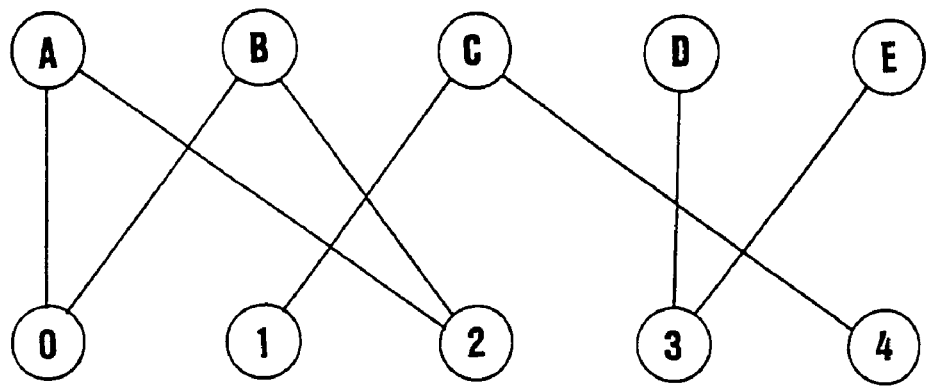
FIGS. 10A and 10B show examples of the logical correspondence between bipartite graph and bidimensional matrix.

The algorithm for obtaining said data structures is applied to access structures of the "bipartite graph" kind, e.g. as the one represented in FIG. 10A. In such a graph the nodes can be separated into two separate subgroups (from A to E and from 0 to 4 in figure), in such a way that each node belonging to a first subset can be connected only with nodes belonging to the second subset and vice versa With reference to FIG. 10A, node A is connected with node 0 and node 2, node B is connected with node 0 and node 2, node C is connected with node 1 and node 4, node D is connected with node 3, and node E is connected with node 3.

Such connections can be expressed by means of a bidimensional matrix of the kind reported in FIG. 10B, where with the symbol x the connections active between lines and columns have been represented. Therefore, it can be concluded that the bipartite graphs are equivalent to the bidimensional matrices and that therefore the constant time accessibility results obtained with reference to the above cited article can also apply to structures such as bidimensional matrices.

Therefore, the compression element will compress the sequences obtained through the conversion element, and will generate a variety of bidimensional matrices indicating such sequences.

The algorithm by which the compression element operates, described herebelow, (from STEP 1 to STEP 11) is intended to be implemented in any suitable programming language (e.g. in C language) and stored in a ROM.

The input to the algorithm consists in the sequence of numerical identifiers (records) of a preset variable length.

By way of example, together with the various algorithm steps a complete compilation cycle for a specific practical case will be reported, in order to fully describe the operation manners of the algorithm itself. Accordingly, reference to communication structures of the Ethernet kind will be made again. Obviously, the operation of the control device according to the present invention remains unaltered even in the event the apparatus for monitoring and interpretation does not provide Ethernet frames monitored on the network, but directly provides instead TCP/IP communications or anyhow very long data streams.

Step 1 (Specification of Predetermined Rules, see also FIG. 11):

It is supposed to have to manage and coordinate Ethernet communication frames by means of the following connection diagrams:

connection a) 132.147.200.10 can connect with 132.147.160.1 only for the service:

WWW, service TCP 80.

connection b) 132.147.200.10 can connect with 132.147.160.2 for the services only:

SMTP, service TCP 25;

NETBIOS, services TCP 137, 138 and 139.

connection c) 132.147.200.20 can connect with 132.147.160.1 only for the services:

FTP, services TCP 20 and 21;

TELNET, service TCP 23.

connection d) 132.147.200.20 can connect with 132.147.160.2 only for the services:

SMTP, service TCP 25;

WWW, service TCP 80.

connection e) 132.147.200.20 can connect with 132.147.160.3 only for the services:

WWW, service TCP 80;

SNMP, services TCP 161 and 162;

NFS, service TCP 2049;

TELNET, service TCP 23.

Further, all the communications of the ARP (Ethernet layer protocol) and ICMP (IP-layer protocol) kind will have to be accepted.

Step 2 (Conversion of Rules in a Set of Sequences):

A set of 17 records (in which each record consists of a set of <item>/<action> pairs) is obtained based on said connection diagram. In particular, record 1 represents connection a), records 2 to 5 represent connection b), records 6 to 8 represent connection c), records 9 to 10 represent connection d), records 11 to 15 represent connection e), record 16 represents the Ethernet ARP protocol, and lastly record 17 represents the ICMP protocol in IP.

Connection a)

RECORD 1

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x0A, 0x400F | 132.147.200.10 |
| 0x84, 0x4010 | |
| 0x93, 0x4011 | |
| 0xA0, 0x4012 | |
| 0x01, 0x4013 | 132.147.160.1 |
| 0x00, 0x8002 | |
| 0x50, 0x8003 | WWW 80 |

Connection b)

RECORD 2

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x0A, 0x400F | 132.147.200.10 |
| 0x84, 0x4010 | |
| 0x93, 0x4011 | |
| 0xA0, 0x4012 | |
| 0x02, 0x4013 | 132.147.160.2 |
| 0x00, 0x8002 | |
| 0x19, 0x8003 | SMTP 25 |

RECORD 3

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x0A, 0x400F | 132.147.200.10 |
| 0x84, 0x4010 | |
| 0x93, 0x4011 | |
| 0xA0, 0x4012 | |
| 0x02, 0x4013 | 132.147.160.2 |
| 0x00, 0x8002 | |
| 0x89, 0x8003 | NETBIOS 137 |

RECORD 4

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x0A, 0x400F | 132.147.200.10 |
| 0x84, 0x4010 | |
| 0x93, 0x4011 | |
| 0xA0, 0x4012 | |
| 0x02, 0x4013 | 132.147.160.2 |
| 0x00, 0x8002 | |
| 0x8A, 0x8003 | NETBIOS 138 |

RECORD 5

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x0A, 0x400F | 132.147.200.10 |
| 0x84, 0x4010 | |
| 0x93, 0x4011 | |
| 0xA0, 0x4012 | |
| 0x02, 0x4013 | 132.147.160.2 |
| 0x00, 0x8002 | |
| 0x8B, 0x8003 | NETBIOS 139 |

-continued

Connection c)

RECORD 6

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x01, 0x4013 | 132.147.160.1 |
| 0x00, 0x8002 | |
| 0x14, 0x8003 | FTP 20 |

RECORD 7

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x01, 0x4013 | 132.147.160.1 |
| 0x00, 0x8002 | |
| 0x15, 0x8003 | FTP 21 |

RECORD 8

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x01, 0x4013 | 132.147.160.1 |
| 0x00, 0x8002 | |
| 0x17, 0x8003 | TELNET 23 |

Connection d)

RECORD 9

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x02, 0x4013 | 132.147.160.2 |
| 0x00, 0x8002 | |
| 0x19, 0x8003 | SMTP 25 |

RECORD 10

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x02, 0x4013 | 132.147.160.2 |
| 0x00, 0x8002 | |
| 0x50, 0x8003 | WWW 80 |

-continued

Connection e)

RECORD 11

| | |
|---|---|
| 0x08, 0x000C | |
| 0x00, 0x000D | Ethernet IP protocol |
| 0x06, 0x4009 | TCP/IP protocol |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x03, 0x4013 | 132.147.160.3 |
| 0x00, 0x8002 | |
| 0x50, 0x8003 | WWW 80 |

RECORD 12

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x03, 0x4013 | 132.147.160.3 |
| 0x00, 0x8002 | |
| 0xA1, 0x8003 | SNMP 161 |

RECORD 13

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x03, 0x4013 | 132.147.160.3 |
| 0x00, 0x8002 | |
| 0xA2, 0x8003 | SNMP 162 |

RECORD 14

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x03, 0x4013 | 132.147.160.3 |
| 0x08, 0x8002 | |
| 0x01, 0x8003 | NFS 2049 |

RECORD 15

| | |
|---|---|
| 0x08, 0x000C | |
| 0x00, 0x000D | IP protocol in Ethernet |
| 0x06, 0x4009 | TCP protocol in IP |
| 0x84, 0x400C | |
| 0x93, 0x400D | |
| 0xC8, 0x400E | |
| 0x14, 0x400F | 132.147.200.20 |
| 0x84, 0x4010 | |
| 0x93, 0x4011 | |
| 0xA0, 0x4012 | |
| 0x03, 0x4013 | 132.147.160.3 |
| 0x00, 0x8002 | |
| 0x17, 0x8003 | TELNET 23 | and lastly

-continued

| RECORD 16 | |
|---|---|
| 0x08, 0x000C | |
| 0x06, 0x000D | ARP protocol in Ethernet |
| RECORD 17 | |
| 0x08, 0x000C | |
| 0x00, 0x000D | IP protocol in Ethernet |
| 0x01, 0x4009 | ICMP protocol in IP |

The structure thus obtained can be expressed in a matricial form, according to the representation in FIG. 12. It is to be noted that the various records can have different lengths. In fact, there are 15 records of length 13, 1 record of length 2 and 1 record of length 3.

Step 3:
Set CONT=0
Step 4:
Column 0 and column CONT of the above reported sequence are taken, and a new sequence of records containing only 2 items (the one in column 0 and the one in column CONT) is created.
Step 5:
Doubles are eliminated from this new sequence of records.
Step 6:
Set ROW=0
Step 7:
A weighted bipartite graph is created with the new record sequence, by inserting for each record:
 the value of the item in position 0 (upper node id);
 the value of the item in position CONT (lower node id);
 the action of the item in position CONT (as the first weight of the arc between the two nodes);
 ROW (as the second weight of the arc between the two nodes).
Further, for each pair of inserted nodes, the item value in the position 0 in the original record sequence is replaced with the new ROW value, and then ROW=ROW+1 is set.
Step 8:
The bipartite graph thus obtained is converted into a bidimensional matrix and a vector by means of the basic algorithm of which at the above mentioned articles. Note however that the algorithm described herewith constitutes an extension of said basic algorithm, in particular concerning the previous step 7.
Step 9:
The bidimensional matrix and the vector are stored.
Step 10:
Set CONT=CONT+1
Step 11:
If CONT is not equal to the maximum number of items of the records the step 4 is repeated, else the algorithm is ended.

The sequence of bidimensional matrices and vectors constitutes the compressed data structure that will be used for recognition of the input streams. Such structure is accessible in a direct manner.

Herebelow again reference to FIG. 9 will be made.

Element 203 (Memory Containing the Compressed Patterns):

Such element consists of the sequence of matrices resulting from the above mentioned compression algorithm. By virtue of the high compression rate of said algorithm, the dimension of this sequence of matrices is directly proportional to the number of active connections of the original matrix, being therefore directly storable in the central memory. In case of a high number of active connections (>100.000.000), said sequence of compressed matrices can be managed by means of mass storage devices.

Element 204 (Pattern Recognizer):

Such element allows the comparison between the application frames to be recognized, monitored by means of the element 205 and the direct access data structure stored in 203.

The element 204 is realized in a microchip, and it substantially consists of a software implementing a direct accessing technique on matrices, in order to access the matrices stored in 203.

Therefore, the acceptability or non acceptability of the frame read from the network can be recognized in a completely deterministic way.

In order to provide a detailed example of the operation of said recognizer, herebelow first of all the structure of the matrices stored in 203 is reported, using a syntax similar to that of the C language:

```
//Structure for a bidimensional Matrix and a vector
typedef struct_matrices_AB {
    unsigned long int row_a;       //Number of rows of the matrix
    unsigned long int col_a;       //Number of columns of the matrix
    unsigned long int col_b;       //Number of elements of the vector
    unsigned long int **mA;        //Matrix of Values
    Action ***mP;                   //Matrix of Actions
    unsigned long int *mB;         //Vector
} mat_AB;
typedef struct_vec_matrices_AB {
    mat_AB * MAB;                  //Set of matrices and vectors
    unsigned long int num_mab;     //Number of matrices and vectors
} * Vec_mat_AB;
```

Five input records and the resulting matrices are reported herebelow. In such example the description of the records is performed by means of the <item>/<action> syntax hereto reported. The associated actions are extremely simplified (a single action per each recognition). Moreover, for sake of simplicity, the recognition is assumed to begin always from the first byte of the input stream.

| RECORD 1 |
|---|
| 0x01 next(1) |
| 0x03 next(1) |
| 0x02 f_send_all |
| RECORD 2 |
| 0x01 next(1) |
| 0x06 next(1) |
| 0x04 f_send_all |
| RECORD 3 |
| 0x02 next(1) |
| 0x07 next(1) |
| 0x03 f_send_all |
| RECORD 4 |
| 0x01 next(1) |
| 0x02 f_send_all |
| RECORD 5 |
| 0x05 next(1) |
| 0x01 f_send_all |

For next(1) the action of positioning on the successive byte in the data stream is intended. For f_send_all the action of forwarding of to the outside all the data stream is intended.

By means of the aforedescribed algorithm the following matricial structure is obtained:

|   | MATRIX OF VALUES | MATRIX OF ACTIONS | VECTOR B |
|---|---|---|---|
| 1 | 0:[X]<br>1:[0]<br>2:[1]<br>3:[X]<br>4:[X]<br>5:[2] | (1, 0)NEXT(1)<br>(2, 0)NEXT(1)<br>(5, 0)NEXT(1) | X 0 0 X X 0 |
| 2 | 0:[X]<br>1:[4]<br>2:[0]<br>3:[1]<br>4:[X]<br>5:[X]<br>6:[2]<br>7:[3] | (1, 0)F_SEND_ALL<br>(2, 0)F_SEND_ALL<br>(3, 0)NEXT(1)<br>(6, 0)NEXT(1)<br>(7, 0)NEXT(1) | 0 0 0 |
| 3 | 0:[0 4]<br>1:[X X]<br>2:[1 X]<br>3:[3 X]<br>4:[2 X] | (2, 0)F_SEND_ALL<br>(3, 0)F_SEND_ALL<br>(4, 0)F_SEND_ALL | 0 0 0 0 1 |

In order not to overburden the present description, the various steps from the records to the graphically described matricial structure (after all, simple applications of the above described algorithm) will not here be described in detail. Moreover, for sake of clarity the matrix of values has been represented as physically separated from the matrix of actions.

Instead, the comparison steps that are performed in order to recognize or not the monitored data streams will be described in detail. Said steps relate to the specific case of matricial structure hereto described.

1) Example of Recognition in the Event the Stream is Identical to the Record 1: 0x01 0x03 0x02

First read value is 01.

Being in an initial condition, it is used as an index of the matrix as well as of the vector.

The adopted Matrix/Vector pair is in the position 1 of the above reported list.

The row index of matrix A is determined by the element which has been read, i.e. Row A=01, i.e. the first row.

The column index of matrix A is determined by the value contained by vector B at the position corresponding to the element which has been read, i.e. Column A=B[0x01]=0, i.e. the 0-th column.

Therefore, the value reported in A[1, 0], i.e. 0 will be read. Said value is the successive index of vector B.

Next, the action reported in A[1, 0], i.e. the numeric value corresponding to the action next(1) will be read.

Therefore the aforesaid action will be executed, thus proceeding to the successive data stream value.

The successive value will be reached, using then the Matrix/Vector pair at position 2 of the above reported list.

Read value is 03.

The row index of Matrix A is determined by the element which has been read, i.e. Row A=03, i.e. the third row.

The column index of matrix A is determined by the value contained in vector B at the position corresponding to the value reported in A[1, 0] obtained in the previous step (i.e. 0). Column A=B[0]=0, i.e. the 0-th column.

Therefore, the value reported in A[3, 0] i.e. 1 will be read. Such value is the next index of vector B.

Then the action reported in A[3, 0], i.e. the numeric value corresponding to the action next(1) will be read.

Therefore, the aforesaid action will be executed, and the position shall be shifted to the next value of the data stream.

The subsequent value will be reached and the Matrix/Vector pair at position 3 of the above reported list will be used.

Read value is 02.

The row index of matrix A is determined by the element which has been read, i.e. Row A=02, i.e. the second row.

The column index of matrix A is determined by the value contained in vector B at the position corresponding to the value reported in A[3, 0] obtained in the previous step (i.e. 1). Column A=B[1]=0, i.e. the 0-th column.

Therefore, the value reported in A[2, 0], i.e. 1, will be read. Such value is the successive index of vector B.

Then the action reported in A[2, 0], i.e. the numeric value corresponding to the action f_send_all, will be read. This means that recognition has occurred.

2) Example of Recognition in the Event the Stream Differs from the Records: 0x04 0x01

First read value is 04.

Being in an initial condition, it is used as an index of the matrix as well as of the vector.

The adopted Matrix/Vector pair is in the position 1 of the above reported list.

The row index of matrix A is determined by the element which has been read, i.e. Row A=04, i.e. the fourth row.

The column index of matrix A is determined by the value contained by vector B at the position corresponding to the element which is read, i.e. Column A=B[04]=X. Therefore the stream is not recognized.

3) Example of Recognition in the Event the Stream Differs from the Records: 0x01 0x05 0x03

The first read value is 01.

Being in an initial condition, it is used as an index of the matrix as well as of the vector.

The adopted pair Matrix/Vector is in the position 1 of the above reported list.

The row index of matrix A is determined by the element which has been read, i.e. Row A=04, i.e. the fourth row.

The column index of matrix A is determined by the value contained by vector B at the position corresponding to the element which is read, i.e. Column A=B[0x01]=0, i.e. the 0-th column.

Therefore, the value reported in A[1,0], i.e. 0 will be read. Said value is the successive index of vector B.

Next, the action reported in A[1, 0] i.e. the numeric value corresponding to the action next(1) will be read.

Therefore, the position shall be shifted to the next value and the Matrix/Vector pair which is at position 2 in the above reported list will be used.

Read value is 05.

The row index of Matrix A is determined by the element which has been read, i.e. Row A=05, i.e. the fifth row.

The column index of Matrix A is determined by the value contained in vector B at the position corresponding to the value reported in A[1, 0] obtained in the previous step. Column A=B[0]=0.

Thus, the value reported in A[5, 0], i.e. X will have to be read. Therefore, the stream is not recognized.

Hence, using a direct access technique on matrices, easily operable in a microchip, the pattern recognizer is able to recognize the acceptability or the non acceptability of the input stream in a completely deterministic manner, in a number of accesses to matrices and vectors equaling the number of elements that are recognized in the same stream.

Herebelow, reference will be again made to FIG. 9.

Element 205:

It is the component for monitoring and acquisition of the communication frames. By means of this apparatus, an example of which has already been described in detail with reference to the preceding figures from 4 to 8B, the data acquisition also at an application level is made possible, i.e. the piece of information related to the layers 4–7 of the OSI standard. Such apparatus will be able to accept commands as CONNECT, SEND, RECEIVE and CLOSE in the event high layer application protocols have to be managed and coordinated.

Element 206 (Access Control):

This element, starting from the recognition result operated by element 204, performs the forwarding action associated to such recognition, or the refusal action associated to the failed recognition.

In the event of acceptance the communication frame will be forwarded to the server of reference.

In the event of refusal, the communication frame will be returned to the sender, together with possible explanations of the refusal. In fact, by virtue of the adopted <item>/<action> structure, it will be possible to associate actions, even complex ones as the construction of answer streams.

Element 207 (Access Coordination):

This element, starting from the recognition result operated by element 204, performs the coordinating action associated to such recognition.

Such coordinating action relates to the individuation of the parameters to be forwarded to the server for the required coordination, individuation of the sender, formatting of the parameters to be forwarded, sending of parameters, acquisition of the answer from the server and forwarding of the obtained answer to element 204 for a possible prosecution of the recognition.

This approach is made possible by means of the second introduced notation, as by virtue of this notation actions can be associated, even complex ones as the construction of streams to be forwarded to specific network accessible servers. The coordinating element proves useful when the apparatus is used to manage communication among applications, therefore on high layer protocols (as those between client and server applications transferred on a TCP layer). In fact, in this event the apparatus, by virtue of the actions associated to input stream recognition, can operate changes in the stream for its re-forwarding to other application servers provided with different application protocols. A typical event occurs when the mutual operativity and the application cooperation have to be managed in a heterogeneous context, and where different "application servers" or different broker devices need to coexist (here referring also to the various CORBA—Common Object Request Broker Architecture—implementations, always not fully compatible among them) in presence of client applications often designed to converse using old application protocols.

The present invention has been described hereto with reference to one of its embodiments, given as non-limiting examples.

Furthermore, it is intended that there are other possible embodiments and kind of services falling within the protective scope of the present industrial property right.

For instance, it might be provided that the access control device is implemented using a board installed on the processor where the "client" applications are operating in a context of the client-server type.

In this way, the fact that the access control device can be programmed by the client computer administrator can be guaranteed, in order to activate the control/coordination/documentation exclusively on the communications that are deemed "important" to control/co-ordinate/document.

As an example, the client administrator can decide:

which communications, and therefore which application services are to be enabled in input to the client;

on which communications, and therefore on which application services, the documentation is to be enabled;

on which communications, and therefore on which application services, specific functions such as authentication, electronic signature etc. are to be programmed;

In the event that there are service centres supplying application services, also provided with the access control device according to the present invention, the client administrator can decide whether to enable certification services of the application services carried out by the objective confirmation of the communication, given by the comparison of what was documented by the client and what was documented by service centre.

As an example, the client administrator can:

decide to disable the access to certain WEB server, i.e. to certain WEB pages made available from a WEB server, decide to enable the documentation of the commercial operations he carried out to certain WEB sites, and set the application services for which it is necessary to authenticate the transaction by electronic signature.

APPENDIX A

1. II Level Language Grammar

The language consists of: types for data representation; operators and rules for comprising expressions; structures for program flow control; function commands and procedures.

1.1. Data Types

Types can be divided into three classes: representation of numbers, representation of strings and representation of sets.

Types for Representation of Numbers

Types for representation of numbers are the following:

WORD LONG

WORD_HL LONG_HL

WORD_LH LONG_LH

The WORD type represents integers within the range $[2^{-15}-2^{15}]$. The width of a WORD is of 2 bytes. Distinction between HL and LH indicates the position of the most representative byte, i.e. the first in HL and the second in LH.

The LONG type represents integers of a very high range $[2^{-31}-2^{31}]$. The width of a LONG is of 4 bytes. Distinction between HL and LH indicates the position of the most representative byte i.e. the first in HL and the last in LH. All other bytes follow in the order of representation.

Specification HL/LH takes into account the various representation rules of the data on a frame by the various network protocols. The user, having these types, will not have to worry about operations related to the reading of the various formats.

Types for Representation of Strings

Types for representation of strings are the following:

BYTE BYTE ( )

STRING

The first two types are byte-oriented, the last three are string-oriented.

BYTE indicates the single byte; when followed by a number within round brackets, indicates a numerically defined byte sequence.

STRING indicates a string of characters.

Types for Representation of Sets

Types for representation of sets are the following:

ENUM

The ENUM type represents the sets of elements of 5 types: WORD, LONG, BYTE, BYTE_STREAM, STRING. Syntax for its use is the following:

ENUM <name> <type>
name1,name2, . . . ,nameN
END

For instance, a set of IP addresses can be represented as follows:

ENUM ip_address BYTE_STREAM
{192,0,10,23},
{192,0,11,24},
{192,0,13,123},
{192,0,1,23},
{192,0,10,323},
. . .
{192,0,15,23},
END
ENUM name_host STRING
"CLIENT1","CLIENT2" . . . "CLIENTn"
END 1.2. Operators and Expressions Operators can be divided in three classes:
arithmetic: + − * / =
bit by bit: | &
on strings: @ <<

Operators + and − have the same priority, lower than that of * and /. All arithmetical operators are associative left to right, except for the allocation operator = that follows the opposite direction.

Operator & indicates the bit by bit AND; operator | indicates the bit by bit inclusive OR. In terms of priority, the former is on the same level of *, the latter on the same level of +.

Binary operator @ indicates concatenation between two variables, to be treated as two strings in binary representation. Binary operator << indicates allocation among strings. For instance, BYTE(6) string1;
STRING string2;
WORD_HL num;
STRING string3;

Once values have been allocated to string1, string3 and num, the following operation can be performed:

string3 << string1 @ string2 @ num ;

Notice the ; at the end of every command.

Priority and associability rules referring to each operator can be modified in a single expression using round brackets (apart from operators << and @ that do not allow brackets).

For a closer examination of the forming and the use of expressions deriving from the above-listed operators see examples herebelow.

1.3. Control Structures

In the II level language there is a single control structure having the following processing syntax:

TEST(<namevar>)
IN <range> : control sequence
IN <range> : control sequence
. . .
. . .
DEFAULT :control or blank sequence ending with;
END The first argument <namevar> indicates the name of a previously declared variable, to which a value was given. On the basis of the latter the test will define whether it belongs to one of the IN blocks herebelow (in this case the block-associated control sequence shall be executed), or to the default block (in this case the control sequence associated to the default block shall be executed).

The argument <range> can be a variable of the ENUM type, or a string-type constant, or a number or a numeric range indicated in square brackets. In the two latter cases (number or numerical range) the number of bytes referring to the basic comparison is to be indicated in square brackets.

If the value of the <namevar> variable belongs to one of the specified <range> the sequence of commands associated thereto is executed. In turn, it has to be noted that a sequence of commands cannot include a test. Moreover, also the sequence of commands associated to the mandatory block of DEFAULT, a block that is executed even in case no one of the previously prompted IN blocks is executed, can be blank, meaning that a space and a final semicolon follow the double colon :. In this event no command will be executed.

An example of the use of the TEST structure is reported herebelow:

TEST(ip_source)
IN ip_address: ;
IN "\0d192\0d.0\0d2\0d32": RETURN 0;
IN 90–200 [4]:
    GET(0, eth_type);
    PRINT(eth_type);
DEFAULT: RETURN −1;
END The ip source variable is of the BYTE(4) type and it is assumed to have been previously prompted and allocated. The ip address variable is of the ENUM type; it has been already defined and allocated in the preceding example. The program idles if the ip source value belongs to the ip address set it gives 0 if it is 192.0.2.32, written as string; executes two commands if it is within the range 90–200; in all the other events it gives −1.

1.4. Functions and Commands

Second level language functions are of two types:
functions of internal library analyseflow.lib;
functions of an external dll linkable to the program.
Internal library functions are as follows:
MOVER(mode, expression)
GET(mode, <namevar>)
PUT(mode, <namevar>)
PRINT(<namevar>)

Apart from PRINT, all functions adopt mode as parameter; it indicates an access channel to a reference data stream according to which the function specific action is to be executed. The channel can be a local one: e.g. mode=1 identifies a local memory buffer; or remote: e.g. mode=1 identifies a TCP connection opened with a client, or a connection opened with a remote DBMS. Besides a predetermined set of access channels, the user can define specific TCP services. This operation is allowed by the command #listen followed by a number identifying a TCP service.

The MOVER function shifts the cursor associated to the data stream selected with mode, for a number of bytes that equals the one which is the result of the expression of the second parameter. The function defines the current position of each cursor according to which a function defines the current position of each cursor, according to which the other functions will operate.

The GET function gives a value to the variable indicated with the <namevar> parameter taking it from the stream indicated with the mode parameter, in the current position of the cursor associated to the stream itself.

The PUT function gives a value to the variable indicated with the <namevar> parameter, data stream indicated with mode parameter, in the current position of the cursor associated to the stream itself.

The PRINT function prints to video the value of the <namevar> variable previously defined and initialized.

The program further allows functions from an external dll. These functions are inserted in a preset buffer and have predetermined names (u_f_1, u_f_2, etc.). The dll has to be constructed so as to let this operation occur correctly. In particular:

it has to be constructed as a succession of functions, each having a serial number which is same of a host function of the preset buffer, it has to be constructed in Visual C++ language;

each function forming it has to have the following structure:

int namefunct (int numparameters, char **parvett, long *dim_vett)

The first parameter is an integer, indicating the number of effective parameters required by the function to carry out the operations that are up to it; the second parameter is a pointer to an array of character pointers; the dimension of the array is numparameters, each pointed buffer is a parameter. Finally, the third parameter is a pointer to an array of long integers. Each element of the array indicates the dimension of the string representing the corresponding parameter.

The #DEFINE command allows to rename these functions with names that can be used inside the program.

1.5. Procedures

The II level language enables to define procedures according to the following syntax:
START <nameproc>
Set of commands forming the procedure.
END A procedure can be recalled by another with the <nameproc> command. i.e., a procedure defines a homonymous command provided for the purpose. E.g.:
TEST(ip_source)
IN ip_address: proc1 ( );
DEFAULT: RETURN −1;
END In the example proc1( ) indicates the recalling of procedure proc1 defined in the program. For further explanation see herebelow the subparagraph procedure on the program structure and the final example.

1.6. The Program Structure

The program structure in the second level language, as it can be seen in the example herebelow, is the following:
DEFINE BLOCK
LISTEN BLOCK
ENUM TYPES DECLARATION BLOCK
START MAIN PROCEDURE
DECLARATION OF VARIABLES
COMMAND SEQUENCE
END MAIN PROCEDURE
SUBPROCEDURES BLOCK
or, more unequivocally:
define my_funct0 u_f_0
define my_funct0 u_f_1
. . .
define my_funct0 u_f_n
listen tcp_serv1
listen tcp_serv2
listen tcp_serv3
enum <name1> type
name11,name12, . . . ,name1n
end
. . .
enum <namem1> type
namem1, namem2, . . . ,namemn
end
START main
   DECLARATION OF VARIABLES
   PROGRAM COMMANDS
END
START proc1
   PROCEDURE COMMANDS
END
. . .
START procn
   PROCEDURE COMMANDS
END 1.7. The Run-Time Performance of the Language A program in that language is a straight-line program where all the instructions look the same time at execution level. In particular the test instruction took a constant time a execution level, independently, from the number of IN clauses and from the type and dimension of IN clauses (string, enum, . . . ).

The invention claimed is:

1. A network access control device through in series deterministic recognition of application frames satisfying a set of predetermined syntactical rules comprising:
   means for monitoring and interpretation of the application frames to recognize;
   means for storing predetermined syntactical rules;
   means for compiling the predetermined syntactical rules in a direct access data structure;
   means for storing said direct access data structure; and
   means for comparing the application frames to be recognized with said direct access data structure,
   whereby the recognition can be performed on any frame component and the direct access data structure allows an access time substantially independent from the number of rules,
wherein the network access control device further comprises forwarding means, for forwarding the application frame when recognized and return-to-sender means, for returning of the application frame when not recognized, and wherein the means for monitoring and interpretation of the application frames comprise:
   a) a data packets monitoring device at a layer corresponding to the OSI layer 2, said data packets comprising control frames and information frames, wherein the control and information frames contain a header portion and a body portion, said header portion allowing the distinction between an information frame and a control frame;
   b) a control unit receiving as an input the data coming from the monitoring device and comprising means for the discrimination of the control frames from the information frames;

c) a dating unit connected to the control unit and associating a monitoring time to the control frames and to the information frames;
d) a discriminated data storing unit, storing the control and the information frames and the monitoring time thereof, bidirectionally connected to the control unit;
e) a predetermined data storing unit, bidirectionally connected to the control unit, said predetermined data representing possible interpretations of the information frames contained in the discriminated data storing unit;
f) means for comparing, by the control unit, said predetermined data stored in the storing unit with the data contained in the body portion of the information frames stored in the discriminated data storing unit, thus reconstructing the information frames according to their specific application syntax;
g) means for ordering, according to the time and kind of communication, the information frames reconstructed according to their specific application syntax, thus reconstructing application sequences occurred between a determined source processor and a determined destination processor; and
h) means for ordering said information frames ordered according to the time and kind of communication also according to a logical criterion, thus reconstructing the logical path of said application sequences occurred between a determined source processor and a determined destination processor.

2. The access control device according to claim 1, wherein said compiling means of the predetermined syntactical rules comprise:
   conversion means, for converting the predetermined syntactical rules in a set of basic sequences of numerical identifiers; and
   compression means, for compressing the set of sequences thus obtained in a direct access data structure.

3. The access control device according to claim 1, wherein said return-to-sender means, for returning the application frames when not recognized, return information related to the reason of the failed forwarding.

4. The access control device according to claim 1, wherein the predetermined syntactical rules are stored as pairs of <object>/<action> fields.

5. The access control device according to claim 4, wherein the predetermined syntactical rules are stored as pairs of <data type>/<data value> fields.

6. The access control device according to claim 4, wherein the predetermined syntactical rules include one or more joker values.

7. The network access monitoring device according to claim 4, wherein the field <action> refers to the minimal set of commands
Push
<value>
<variable>
<reading position>
<value at the reading position>
Pop
<variable>
<reading position>
<at the reading position>
And
Mul
Add
Equal
Next
F_send_all
F_dynamic.

8. The access control device according to claims 2, wherein the direct access data structure is represented through a matricial structure comprising object fields and action fields.

9. The access control device according to claim 1, wherein said means for ordering said information frames according to a logical criterion comprise means for reciprocally comparing the body portion of the information frames.

10. The access control device according to claim 1, wherein said means for ordering said information frames according to a logical criterion comprise means for comparing each sequence of body portions of the information frames with a set of predetermined sequences, said predetermined sequences representing possible interpretations of the information frames sequences contained in the discriminated data storing unit (17), said predetermined sequences being contained in said predetermined data storing unit (18).

11. The access control device according to claim 1, wherein it is implemented using a board installed on the processor on which the client applications operate.

* * * * *